(12) United States Patent
Oda et al.

(10) Patent No.: US 11,516,073 B2
(45) Date of Patent: Nov. 29, 2022

(54) MALFUNCTION POINT ESTIMATION METHOD AND MALFUNCTION POINT ESTIMATION APPARATUS

(71) Applicant: NIPPON TELEGRAPH AND TELEPHONE CORPORATION, Tokyo (JP)

(72) Inventors: Takuya Oda, Musashino (JP); Shokei Kobayashi, Musashino (JP); Akira Hirano, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 44 days.

(21) Appl. No.: 17/281,203

(22) PCT Filed: Oct. 2, 2019

(86) PCT No.: PCT/JP2019/038892
§ 371 (c)(1),
(2) Date: Oct. 21, 2021

(87) PCT Pub. No.: WO2020/075587
PCT Pub. Date: Apr. 16, 2020

(65) Prior Publication Data
US 2022/0045900 A1    Feb. 10, 2022

(30) Foreign Application Priority Data

Oct. 11, 2018 (JP) .............................. JP2018-192797

(51) Int. Cl.
*H04L 41/0668* (2022.01)
*H04L 41/0677* (2022.01)
*H04L 43/0811* (2022.01)

(52) U.S. Cl.
CPC ...... *H04L 41/0668* (2013.01); *H04L 41/0677* (2013.01); *H04L 43/0811* (2013.01)

(58) Field of Classification Search
None
See application file for complete search history.

(56) References Cited

U.S. PATENT DOCUMENTS 8,483,097 B2 * 7/2013 Farkas .................. H04L 45/48
370/216
8,588,076 B2 * 11/2013 Allasia .................. H04L 45/22
370/236.2

(Continued)

FOREIGN PATENT DOCUMENTS

JP    201453658 A    3/2014

OTHER PUBLICATIONS

J. Postel, Internet Control Message Protocol—DARPA Internet Program—Protocol Specification, literature, Sep. 1981.

(Continued)

*Primary Examiner* — Ranodhi Serrao

(57) ABSTRACT

A failure location estimation apparatus sets partial networks obtained by dividing a network into one or more networks, and verifies connectivity of a path for each of combinations of terminal nodes for each of the partial networks. The failure location estimation apparatus selects some or all combinations of the combinations of terminal nodes determined to have an abnormality in connectivity for each of the partial networks, and verifies connectivity of a path for each of combinations of nodes included in a selected node connection that is the selected combinations of terminal nodes. The failure location estimation apparatus estimates a failure location in the network based on a verification result of connectivity of each of the combinations of nodes.

8 Claims, 17 Drawing Sheets

(56) References Cited

U.S. PATENT DOCUMENTS

| | | | | |
|---|---|---|---|---|
| 8,724,518 B2* | 5/2014 | Ogasahara | ............ | H04L 12/413 |
| | | | | 370/258 |
| 9,059,918 B2* | 6/2015 | Mohan | .................... | H04L 63/00 |
| 9,064,216 B2* | 6/2015 | Reddy | .................... | H04L 43/04 |
| 9,137,118 B2* | 9/2015 | Himura | .................... | H04L 41/12 |
| 9,497,107 B1* | 11/2016 | Akiya | .................... | H04L 43/10 |
| 2013/0332399 A1* | 12/2013 | Reddy | .................... | H04L 45/38 |
| | | | | 706/12 |
| 2014/0010109 A1* | 1/2014 | Himura | ............... | H04L 41/0853 |
| | | | | 370/254 |
| 2014/0040476 A1* | 2/2014 | Ishida | .................... | H04L 45/64 |
| | | | | 709/226 |
| 2015/0249587 A1* | 9/2015 | Kozat | .................... | H04L 43/20 |
| | | | | 370/236 |

OTHER PUBLICATIONS

A. Conta et al., Internet Control Message Protocol (ICMPv6) for the Internet Protocol Version 6 (IPv6) Specification, literature, Mar. 2006.

* cited by examiner

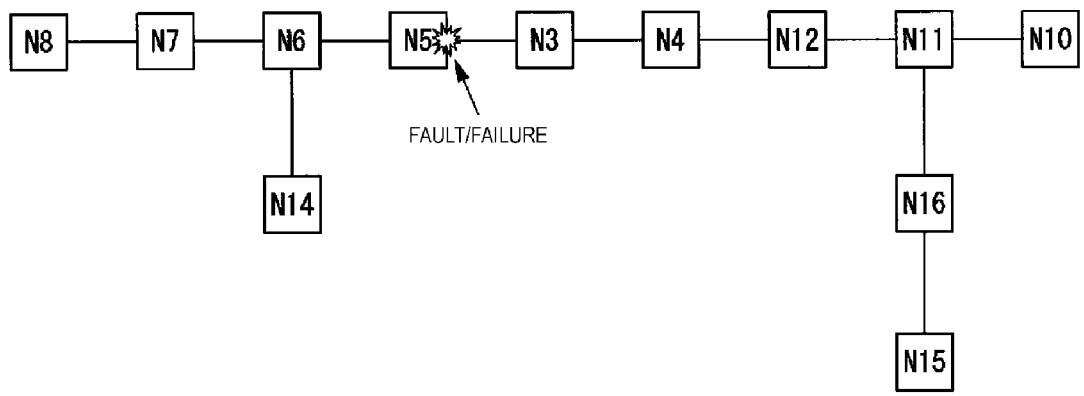
Fig. 5
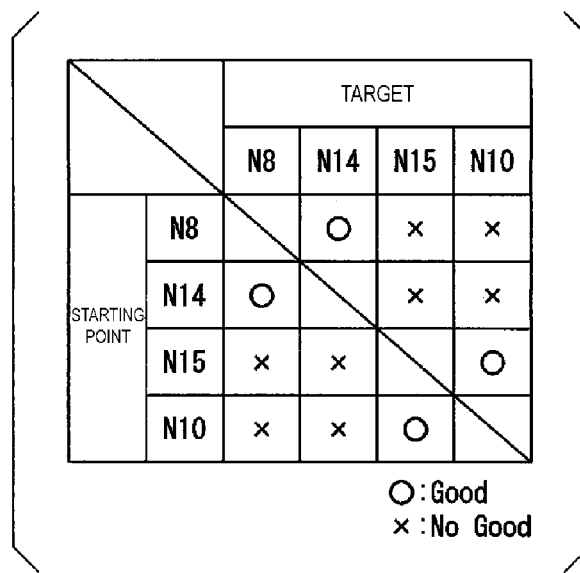
Fig. 6
| PORTION BETWEEN TERMINAL NODES WHERE CONNECTIVITY VERIFICATION IS NG | NUMBER OF NODES | RELATED NODES |
|---|---|---|
| N8-N15 | 10 | N8/N7/N6/N5/N3/N4/N12/N11/N16/N15 |
| N8-N10 | 9 | N8/N7/N6/N5/N3/N4/N12/N11/N10 |
| N14-N15 | 9 | N14/N6/N5/N3/N4/N12/N11/N16/N15 |
| N14-N10 | 8 | N14/N6/N5/N3/N4/N12/N11/N10 |
Fig. 7

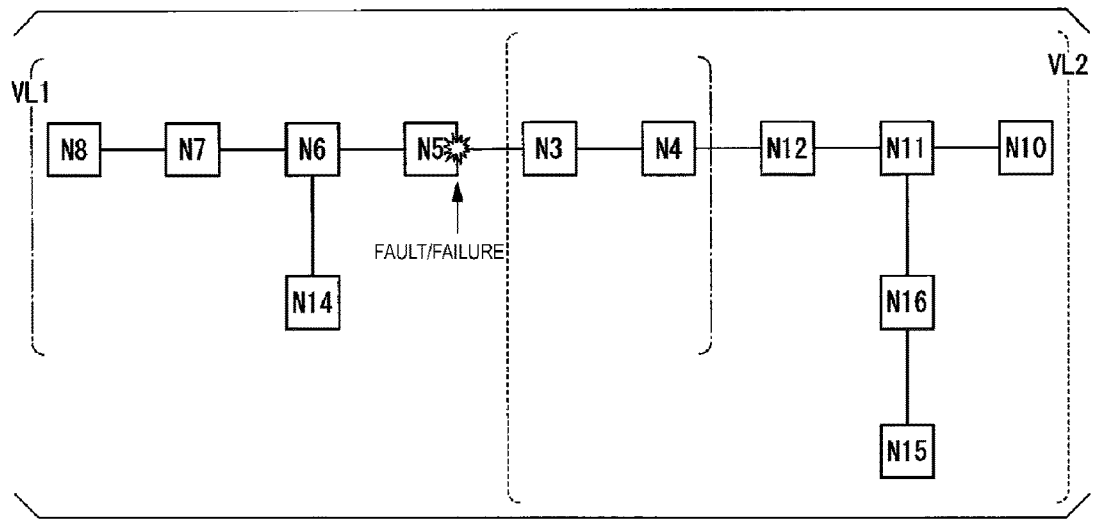
Fig. 11
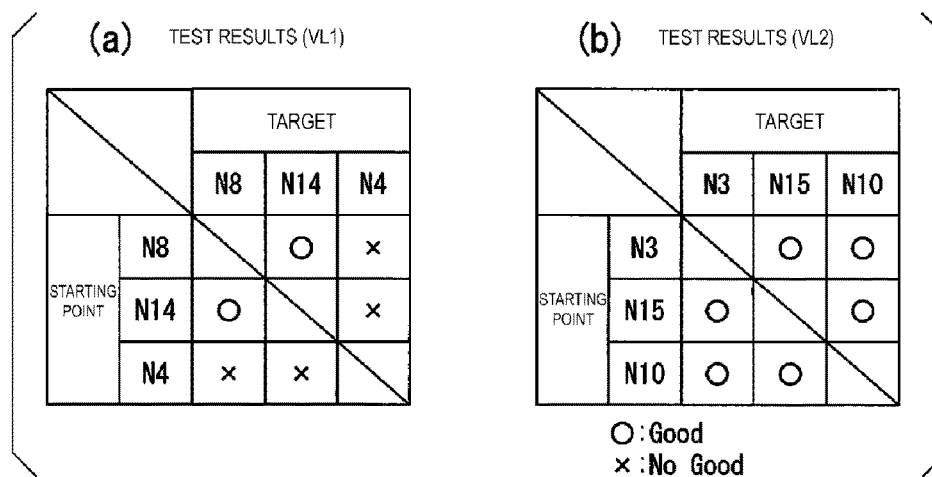
Fig. 12
| VL1 | | |
|---|---|---|
| PORTION BETWEEN TERMINAL NODES WHERE CONNECTIVITY VERIFICATION IS NG | NUMBER OF NODES | RELATED NODES |
| N8-N4 | 6 | N8/N7/N6/N5/N3/N4 |
| N14-N4 | 5 | N14/N6/N5/N3/N4 |
| VL2 | | |
|---|---|---|
| PORTION BETWEEN TERMINAL NODES WHERE CONNECTIVITY VERIFICATION IS NG | NUMBER OF NODES | RELATED NODES |
| NO | | |
Fig. 13

| METHOD OF EXECUTION | NUMBER OF TIMES OF EXECUTION OF PING | | | |
|---|---|---|---|---|
| | | BETWEEN ALL NODES | BETWEEN TERMINAL NODES | BETWEEN ALL NODES (PERFORMED AT MINIMUM NODE CONNECTION) |
| NON-APPLICATION EXAMPLE (WITHOUT USING DEVISED METHOD) | 66 TIMES | $_{12}C_2$ | – | – |
| FIRST EMBODIMENT (WHEN M = 12, k = 1) | 34 TIMES | – | $_4C_2$ | $_8C_2$ |
| SECOND EMBODIMENT (WHEN M = 12, k = 2) | 16 TIMES | – | $2 \times {_3C_2}$ | $_5C_2$ |

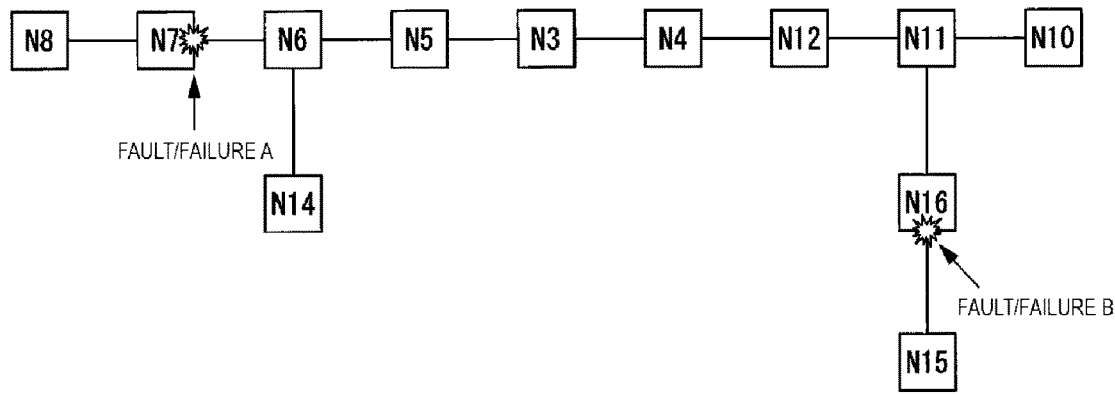
Fig. 18
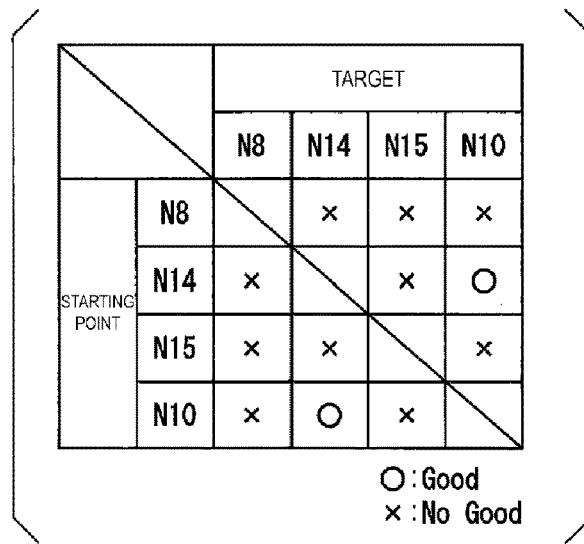
Fig. 19
| PORTION BETWEEN TERMINAL NODES WHERE CONNECTIVITY VERIFICATION IS NG | NUMBER OF NODES | RELATED NODES |
|---|---|---|
| N8-N15 | 10 | N8/N7/N6/N5/N3/N4/N12/N11/N16/N15 |
| N8-N10 | 9 | N8/N7/N6/N5/N3/N4/N12/N11/N10 |
| N8-N14 | 4 | N8/N7/N6/N14 |
| N14-N15 | 9 | N14/N6/N5/N3/N4/N12/N11/N16/N15 |
| N15-N10 | 4 | N15/N16/N11/N10 |
Fig. 20

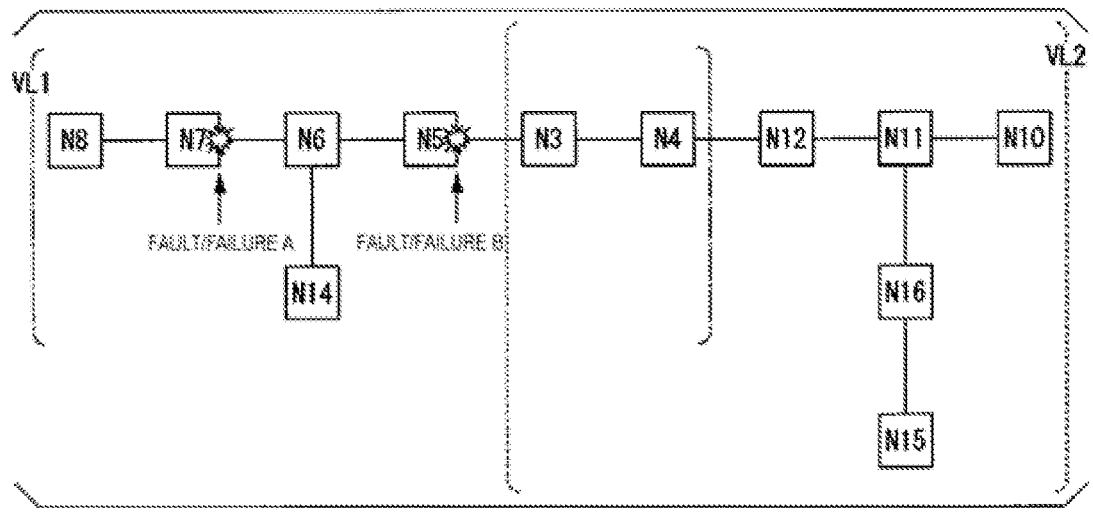
Fig. 24
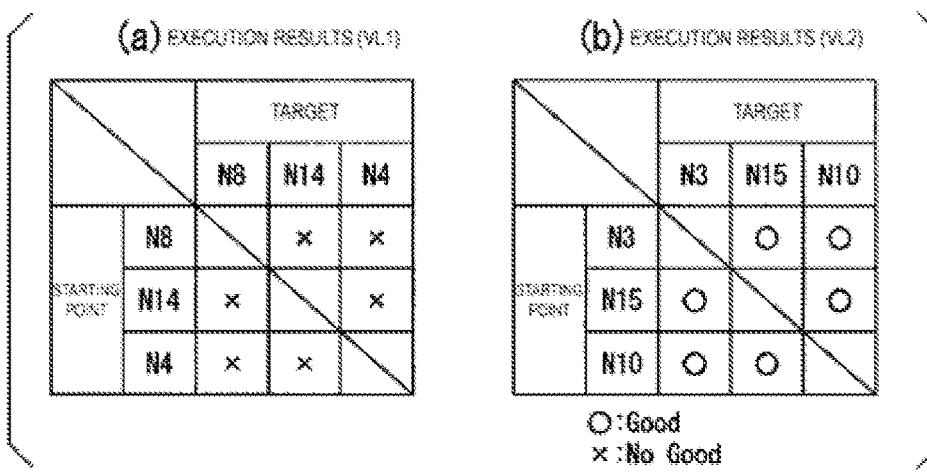
Fig. 25
| VL1 | | |
|---|---|---|
| PORTION BETWEEN TERMINAL NODES WHERE CONNECTIVITY VERIFICATION IS NG | NUMBER OF NODES | RELATED NODES |
| N8-N4 | 6 | N8/N7/N6/N5/N3/N4 |
| N8-N14 | 4 | N8/N7/N6/N14 |
| N14-N4 | 5 | N14/N6/N5/N3/N4 |
| VL2 | | |
|---|---|---|
| PORTION BETWEEN TERMINAL NODES WHERE CONNECTIVITY VERIFICATION IS NG | NUMBER OF NODES | RELATED NODES |
| NO | | |
Fig. 26

| METHOD OF EXECUTION | | NUMBER OF TIMES OF EXECUTION OF PING | | |
|---|---|---|---|---|
| | | BETWEEN ALL NODES | BETWEEN TERMINAL NODES | BETWEEN ALL NODES (PERFORMED AT MINIMUM NODE CONNECTION) |
| NON-APPLICATION EXAMPLE (WITHOUT USING DEVISED METHOD) | 66 TIMES | $_{12}C_2$ | – | – |
| THIRD EMBODIMENT (WHEN M = 12, k = 1) | 18 TIMES | – | $_4C_2$ | $2 \times {_4C_2}$ |
| FOURTH EMBODIMENT (WHEN M = 12, k = 2) | 22 TIMES | – | $2 \times {_3C_2}$ | $_4C_2 + {_5C_2}$ |

MALFUNCTION POINT ESTIMATION METHOD AND MALFUNCTION POINT ESTIMATION APPARATUS

CROSS-REFERENCE TO RELATED APPLICATIONS

This application is a 371 U.S. National Phase of International Application No. PCT/JP2019/038892 filed on Oct. 2, 2019, which claims priority to Japanese Application No. 2018-192797 filed on Oct. 11, 2018. The entire disclosures of the above applications are incorporated herein by reference.

TECHNICAL FIELD

The present invention relates to a failure location estimation method and a failure location estimation apparatus.

BACKGROUND ART

When a fault occurs in a path that is a physical communication line or a logical communication path (hereinafter, collectively referred to as a "service path") in a communication network, it is particularly important to identify where (in which device) a failure occurs in the network. In networks including routers and switches (nodes), identification (segmentation) of failure locations is often attempted using an acknowledgement protocol such as ping using an Internet Control Message Protocol (ICMP) specified by Non Patent Literatures 1 and 2.

In ping, an echo request message of the ICMP is transmitted from one device to a target device, and reachability is verified by receiving an echo reply message from the target device. A combination of two devices that perform ping is changed and results are compared to identify a location where a failure has occurred. Echo request and echo reply ping messages are transmitted and received so as to share the same physical path as the service path. As such, there are few chances to allow ping messages to function in a usual state (normal time), and it is common for a person to manually type a command into a device to allow ping messages to function (to be used) when a fault occurs. However, because a person types a command into the device and makes determination on the basis of obtained results, the segmentation operation of the failure location is often mistaken. The tendency becomes stronger especially when the network becomes larger in size and the number of devices becomes larger. Thus, there has been an attempt to program (/automate/mechanize) the segmentation operation of a failure location by ping (for example, see PTL 1).

CITATION LIST

Patent Literature

PTL 1: JP 2014-53658 A

Non Patent Literature

NPL 1: RFC792, "Internet Control Message Protocol", 1981
NPL 2: RFC4443, "Internet Control Message Protocol (ICMPv6) for the Internet Protocol Version 6 (IPv6) Specification", 2006

SUMMARY OF THE INVENTION

Technical Problem

In programming the segmentation operation of a failure location by ping, it is necessary to take into account all relationships between a service path and devices to associate the failure location with results of ping in advance. This association (hereinafter, referred to as a pattern) is complex and the number thereof is enormous. In this case, if the service path is only Point-to-Point (P2P), combinations of nodes to be segmented (hereinafter referred to as a network to be validated) are relatively simple. On the other hand, if the service path is like MultiPoint-to-MultiPoint (MP2MP), the configuration of the network to be validated becomes complex, and the number of times of executing the acknowledgement protocol required for segmentation is increased. As a result, there has been a problem that automation becomes difficult or computational load increases.

In light of the foregoing, an object of the present invention is to provide a failure location estimation method and a failure location estimation apparatus capable of reducing the number of times of executing reachability verification performed to estimate a location where a network fault occurs.

Means for Solving the Problem

One aspect of the present invention is a failure location estimation method including: a division step of setting a partial network, the partial network being obtained by dividing a network having a plurality of nodes by a division number k (k is an integer of 1 or greater); a first connectivity verification step of setting the partial network as a diagnostic unit network and verifying, on a per diagnostic unit network basis, connectivity of a path for each of combinations of terminal nodes in the diagnostic unit network; a selection step of selecting, on a per diagnostic unit network basis, some or all combinations of the combinations determined to have an abnormality in connectivity in the first connectivity verification step; a second connectivity verification step of verifying, on a per diagnostic unit network basis, connectivity of a path for each of combinations of nodes included in a selected node connection, the selected node connection being the combinations selected in the selection step; and a failure location estimation step of estimating a failure location in the network based on a verification result of connectivity in the second connectivity verification step.

One aspect of the present invention is the failure location estimation method described above, in which in the division step, the partial network is set such that two or more of the nodes identical to each other in two adjacent partial networks are shared.

One aspect of the present invention is the failure location estimation method described above, in which, in the selection step, a combination having a smallest or largest number of the nodes included in a connection between the terminal nodes, of the combinations of terminal nodes determined to have an abnormality in connectivity, is selected on a per diagnostic unit network basis.

One aspect of the present invention is the failure location estimation method described above, in which, in the selection step, two or more combinations not sharing any of the nodes are selected from the combinations of terminal nodes determined to have an abnormality in connectivity in the first connectivity verification step, on a per diagnostic unit network basis.

One aspect of the present invention is the failure location estimation method described above, in which a remaining partial network including at least a portion of the diagnostic unit network excluding the selected node connection having the failure location estimated in the failure location estimation step is set as a new diagnostic unit network, and the first connectivity verification step, the selection step, the second connectivity verification step, and the failure location estimation step are performed.

One aspect of the present invention is the failure location estimation method described above, in which ping or traceroute using an Internet Control Message Protocol (ICMP) is used for verifying connectivity.

One aspect of the present invention is the failure location estimation method described above, in which the network includes a physical node, a logical node, or a combination of a physical node and a logical node.

One aspect of the present invention is a failure location estimation apparatus including: a division unit configured to set a partial network, the partial network being obtained by dividing a network having a plurality of nodes by a division number k (k is an integer of 1 or greater); a first connectivity verification unit configured to set the partial network as a diagnostic unit network and verify, on a per diagnostic unit network basis, connectivity of a path for each of combinations of terminal nodes in the diagnostic unit network; a selection unit configured to select, on a per diagnostic unit network basis, some or all combinations of the combinations determined to have an abnormality in connectivity in the first connectivity verification unit; a second connectivity verification unit configured to verify, on a per diagnostic unit network basis, connectivity of a path for each of combinations of nodes included in a selected node connection, the selected node connection being the combinations selected in the selection unit; and a failure location estimation unit configured to estimate a failure location in the network based on a verification result of connectivity in the second connectivity verification unit.

Effects of the Invention

According to the present invention, it is possible to reduce the number of times of executing reachability verification performed to estimate a location where a network fault occurs.

BRIEF DESCRIPTION OF DRAWINGS

FIG. 5 is a diagram illustrating a failure location in a VLAN network according to the first embodiment.

FIG. 6 is a diagram illustrating first test result information according to the first embodiment.

FIG. 7 is a diagram illustrating the number of nodes in a connection between terminal nodes in which connectivity has not been verified, and the nodes, according to the first embodiment.

FIG. 11 is a diagram illustrating division of a VLAN network according to the second embodiment.

FIG. 12 is a diagram illustrating first test result information according to the second embodiment.

FIG. 13 is a diagram illustrating the number of nodes in a connection between terminal nodes in which connectivity has not been verified, and the nodes, according to the second embodiment.

FIG. 18 is a diagram illustrating a failure location in a VLAN network according to the third embodiment.

FIG. 19 is a diagram illustrating first test result information according to the third embodiment.

FIG. 20 is a diagram illustrating the number of nodes in a connection between terminal nodes in which connectivity has not been verified, and the nodes, according to the third embodiment.

FIG. 24 is a diagram illustrating division of a VLAN network according to the fourth embodiment.

FIG. 25 is a diagram illustrating first test result information according to the fourth embodiment.

FIG. 26 is a diagram illustrating the number of nodes in a connection between terminal nodes in which connectivity has not been verified, and the nodes, in each partial network, according to the fourth embodiment.

DESCRIPTION OF EMBODIMENTS

Hereinafter, embodiments of the present invention will be described in detail with reference to the drawings. The present embodiments each relate to a failure location estimation method for estimating a fault site when a network fault occurs in a communication network, and a failure location estimation apparatus that executes the failure location estimation method.

In the failure location estimation method according to each of the present embodiments, in a case where a service path of a communication network serving as a network to be validated is MP2MP, the network to be validated is virtually divided by a division number k (k is an integer of 1 or greater). In the following, a network to be validated that has been divided is described as a divided network to be validated. Note that, in a case that the division number k is 1, a divided network to be validated remains a network to be validated itself.

Next, a failure location in the network to be validated is identified on the basis of a result of verifying connectivity by an acknowledgement protocol to all the divided networks to be validated. At this time, first, a connectivity verification by the acknowledgement protocol is performed between terminal nodes of each of the divided networks to be validated, and, of combinations of terminal nodes determined to be abnormal, a combination of terminal nodes having the smallest number of nodes that are passed (hereinafter referred to as a minimum node connection) is selected. Furthermore, connectivity verification by the acknowledgement protocol is performed for each of combinations of all nodes in the minimum node connection to determine presence or absence of a failure location and identify a failure location when there is a failure. Note that in a case where there is no combination of terminal nodes to be disconnected in a certain divided network to be validated, the divided network to be validated is not incorporated into a subsequent segmentation process because no more connectivity verification is required. According to the method described above, the number of times of executing the acknowledgement protocol in the network to be validated required for identification of the failure location is reduced. The acknowledgement protocol may use, for example, ping or traceroute using an Internet Control Message Protocol (ICMP).

Figure 1:
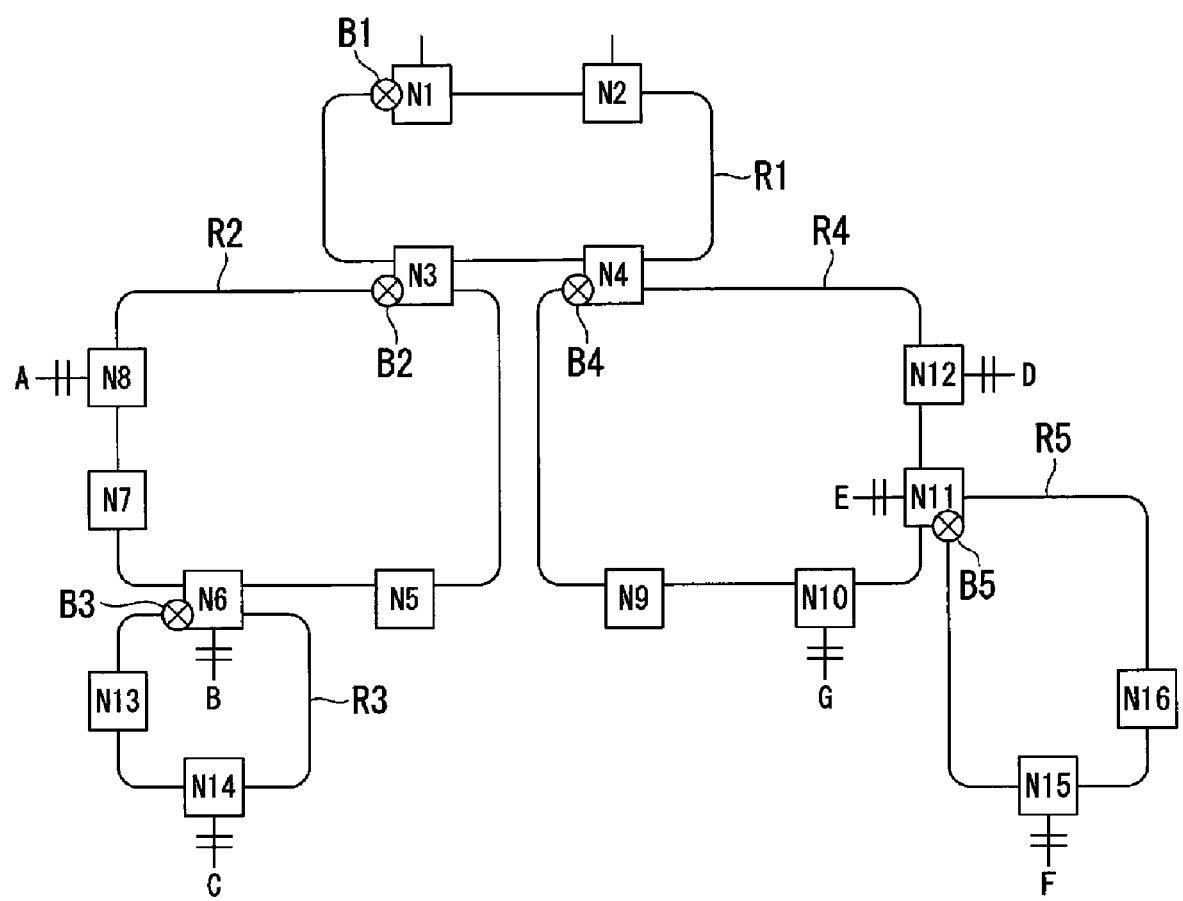
FIG. 1 is a diagram illustrating an overall configuration of a physical network according to an embodiment of the present invention.

FIG. 1 is a diagram illustrating an overall configuration of a physical network according to an embodiment of the present invention. The physical network to be managed and monitored illustrated in FIG. 1 includes a plurality of Ethernet (registered trade name) switch nodes (hereinafter, referred to as switches) N1 to N15. Note that the switches N1 to N15 are collectively referred to as the switches N. The switches N each are an example of a physical node.

The physical network illustrated in FIG. 1 includes rings R1 to R5 in which a plurality of switches N are connected in a ring shape. In the ring R1, the switches N1 to N4 are connected in a ring shape. In the ring R2, the switches N3 and N5 to N8 are connected in a ring shape. In the ring R3, switches N6, N13, and N14 are connected in a ring shape. In the ring R4, the switches N4 and N9 to N12 are connected in a ring shape. In the ring R5, the switches N11, N15, and N16 are connected in a ring shape.

For each ring Ri (i=1, 2, 3, 4, or 5), a block port Bi is set so that a frame does not loop within the relevant ring, and a communication path is uniquely determined. A block port B1 is provided in the switch N1 that belongs to the ring R1 and is connected to another network. A block port B2 is provided in the switch N3 belonging to the ring R1 and the ring R2, a block port B3 is provided in the switch N6 belonging to the ring R2 and the ring R3, a block port B4 is provided in the switch N4 belonging to the ring R1 and the ring R4, and a block port B5 is provided in the switch N11 belonging to the ring R4 and the ring R5.

The physical network is a base network that can construct various logical networks. One or more logical networks that are virtual networks may be constructed on the physical network. One example of the logical networks is a VLAN network. When setting of the switches N is changed on the physical network, "construction of a service path by the VLAN" and the "construction of the UNI" are performed.

Figure 2:
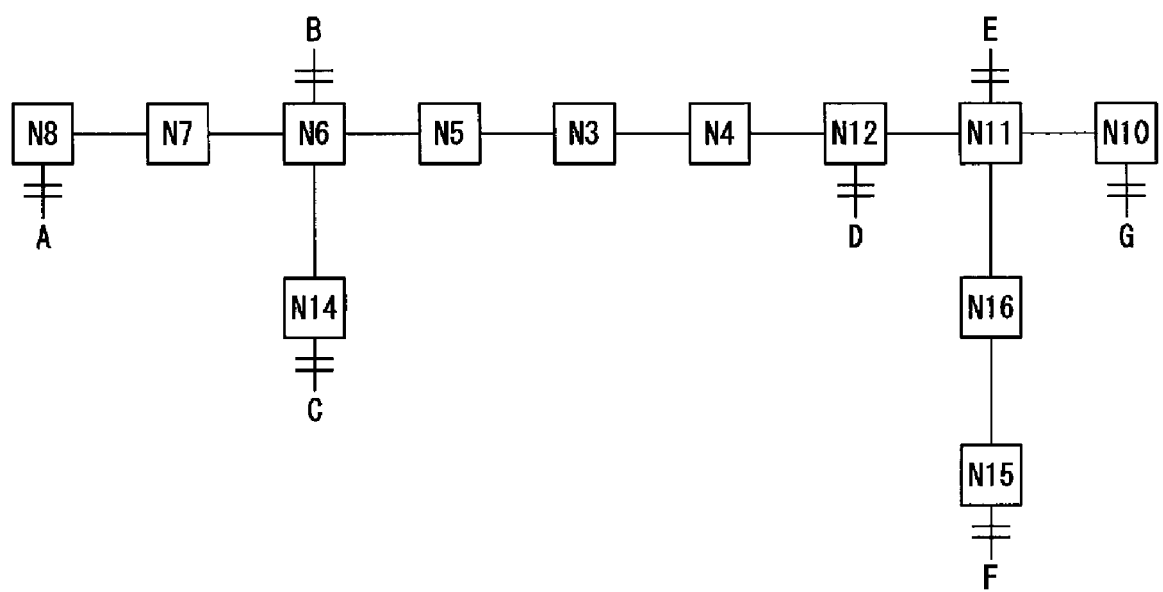
FIG. 2 is a diagram illustrating a switch configuration of a VLAN configured in the physical network illustrated in FIG. 1.

FIG. 2 is a diagram illustrating a switch configuration (hereinafter, referred to as a VLAN network) of a VLAN constructed in the physical network illustrated in FIG. 1. In the VLAN network illustrated in FIG. 2, a service path is configured to be MP2MP. Some nodes or all nodes in the physical network are related to a logical network, and some nodes are related to the VLAN network illustrated in FIG. 2. Related nodes include, for example, a node that may be a starting point or an end point in a logical network and a node that relays communications between the nodes. The VLAN network illustrated in FIG. 2 has a number of nodes M of 12 (M=12) and the switches N8, N10, N14, and N15 are terminal nodes.

Furthermore, seven User Network Interfaces (UNIs)-A to G are configured in the VLAN network. The UNI-A is provided in the switch N8, the UNI-B is provided in the switch N6, the UNI-C is provided in the switch N14, the UNI-D is provided in the switch N12, the UNI-E is provided in the switch N11, the UNI-F is provided in the switch N15, and the UNI-G is provided in the switch N10. In FIG. 1, the UNIs-A to G in the physical network are illustrated. The following description assumes the configuration of the VLAN network illustrated in FIG. 2. In addition, in selection rules for a selected node connection, a similar procedure will be used regardless of using a minimum or a maximum, and thus, for ease of explanation, a case where a minimum is selected (minimum node connection) will be described below as an example.

Figure 3:
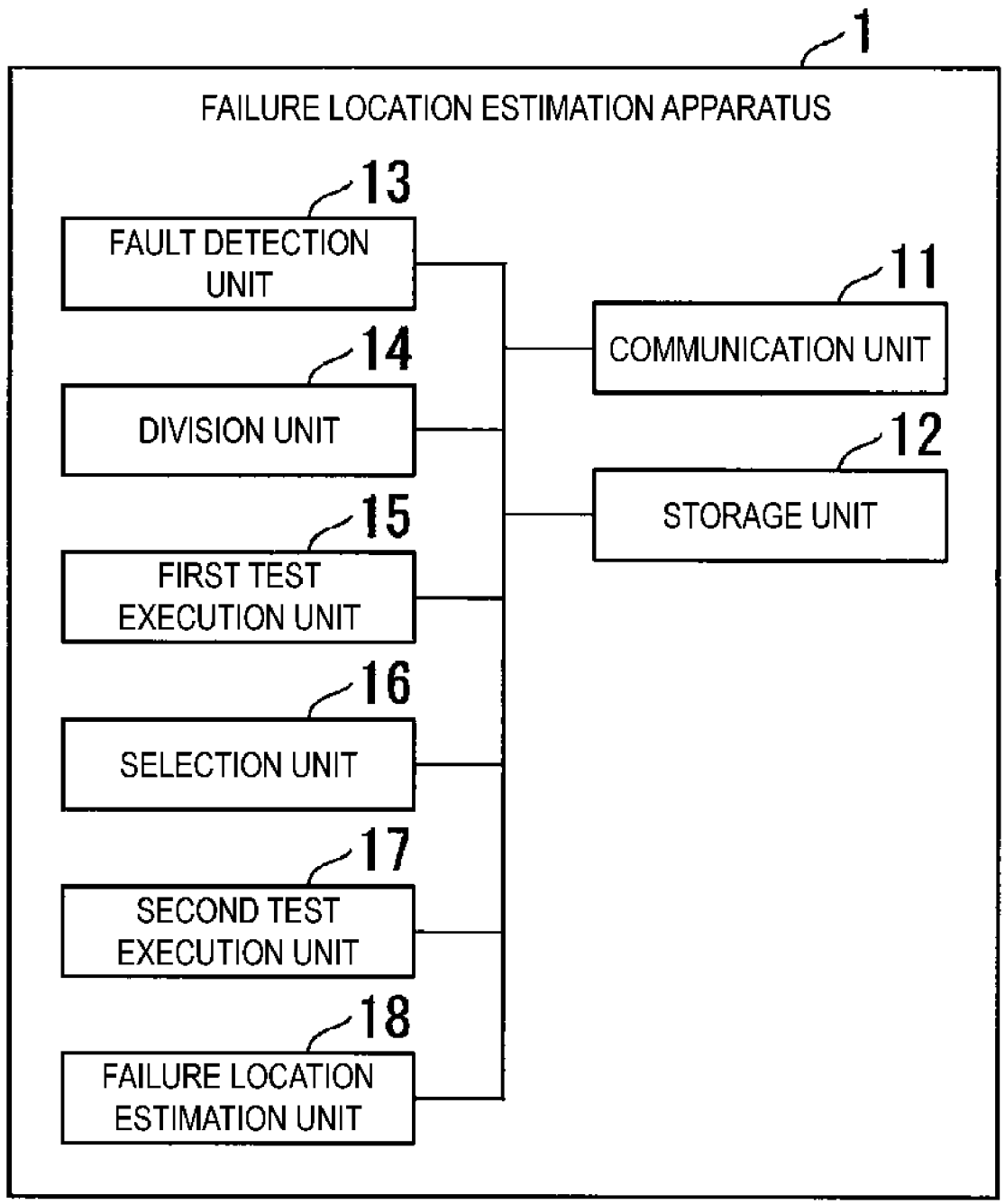
FIG. 3 is a functional block diagram illustrating a configuration of a failure location estimation apparatus according to an embodiment.

FIG. 3 is a functional block diagram illustrating a configuration of a failure location estimation apparatus 1 according to an embodiment of the present invention, and only functional blocks related to the present embodiment are extracted and illustrated. The failure location estimation apparatus 1 includes a communication unit 11, a storage unit 12, a fault detection unit 13, a division unit 14, a first test execution unit 15, a selection unit 16, a second test execution unit 17, and a failure location estimation unit 18.

The communication unit 11 transmits and receives data to and from other devices such as each node included in the network. A node is a device that communicates with another node. In the present embodiment, the communication unit 11 communicates with each switch N of the VLAN network.

The storage unit 12 stores various types of information including network configuration information, assumed test result information, and test result information. The network configuration information indicates the network configuration of a network to be validated. For example, the network configuration information is information indicating the configuration of the physical network illustrated in FIG. 1 and the switch configuration of the VLAN network illustrated in FIG. 2. The failure location estimation apparatus 1 may acquire the network configuration information from a node included in the network or a device, system, or the like related to the network via the communication unit 11, and store the information in the storage unit 12. Furthermore, in a case where a change occurs in the network, the failure location estimation apparatus 1 may store information that reflects a content of the change as needed in the storage unit 12. The assumed test result information indicates a result (pattern) of the connectivity test assumed at the time when a fault occurs, for each location where a fault occurs. The test result information includes first test result information indicating test results of the connectivity test performed by the first test execution unit 15, and second test result information indicating test results of the connectivity test performed by the second test execution unit 17.

The fault detection unit 13 detects a fault or a suspected fault (likely to be a fault) of the network. For example, the fault detection unit 13 is notified from a node, a device that manages the network, or the like that a fault or a suspected fault in the network has been detected. Alternatively, the fault detection unit 13 may detect a fault or a suspected fault by, for example, not receiving a signal expected to be transmitted from the network.

The division unit 14 sets the network related to the detected fault or suspected fault as a network to be validated. The network to be validated is the entire or part of the physical network or the entire or part of the logical network and is set based on the content of the detected fault or suspected fault. The division unit 14 divides the network to be validated into partial networks of a preset division number k (k is an integer of 1 or greater) to form diagnostic unit networks. In other words, k represents the number of partial networks after division. When k is 1, the entire network to be validated is a partial network. When k is 2 or greater, the division unit 14 may set partial networks such that two or more nodes identical to each other in two adjacent partial networks are shared.

Note that the network to be validated may include a physical node, a logical node, or a combination of a physical node and a logical node. For example, when one physical node virtually operates as a plurality of nodes, for example, a plurality of virtual servers operate on one server by a server virtualization technique, such virtual nodes are each a logical node. Alternatively, when a plurality of devices work together as a single node by network virtualization, the node is a logical node. These logical nodes may be connected to a physical node or another logical node. In the present embodiment, the entire VLAN network illustrated in FIG. 2 is a network to be validated.

The first test execution unit 15 identifies terminal nodes of a partial network with reference to the network configuration information. The first test execution unit 15 performs a connectivity test on each of combinations between terminal nodes for each partial network, the combinations between terminal nodes being different combinations of two terminal nodes, and writes first test result information indicating the test results into the storage unit 12. With reference to the first test result information, of the portions between terminal nodes in which connectivity has not been verified (connectivity verification has been NG), the selection unit 16 selects a portion having the smallest number of nodes included in the connection between terminal nodes as a minimum node connection. The second test execution unit 17 performs connectivity tests on all combinations of nodes included in the minimum node connection selected by the selection unit 16, and writes second test result information indicating the test results into the storage unit 12. The failure location estimation unit 18 estimates a failure location based on the second test result information. In a case where assumed test result information when a fault occurs in the node of the estimated failure location and the first test result information match, the failure location estimation unit 18 determines that a failure has occurred in the estimated failure location.

In the following first to fourth embodiments, details of a failure location estimation method using the failure location estimation apparatus 1 will be described.

First Embodiment

In the present embodiment, a failure location is identified using the acknowledgement protocol without dividing the VLAN network (division number k=1). The present embodiment is a case where the number of failure locations is one.

Figure 4:
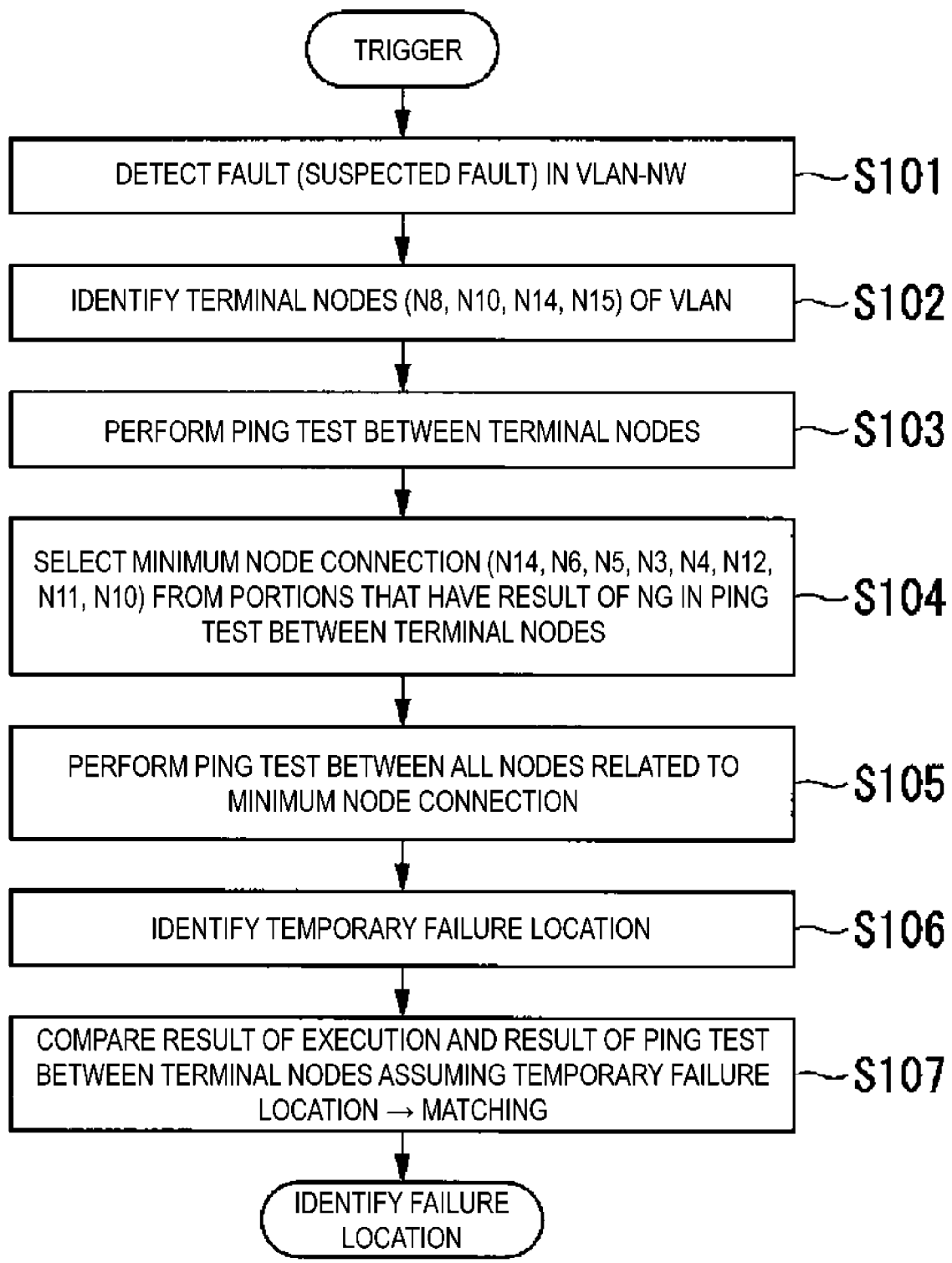
FIG. 4 is a flowchart illustrating processing of a failure location estimation apparatus according to a first embodiment.

FIG. 4 is a flowchart illustrating processing of the failure location estimation apparatus 1 according to the present embodiment. The processing illustrated in FIG. 4 will be described using FIGS. 5 to 9. The fault detection unit 13 of the failure location estimation apparatus 1 detects a fault or suspected fault in the VLAN network (VLAN-NW) (step S101). Because k=1, the division unit 14 sets the entire VLAN network as a diagnostic unit network.

The first test execution unit 15 refers to network configuration information to identify a terminal node of the VLAN network (step S102). The terminal node is a node of the target diagnostic unit network, which has only one connection to another node other than the UNI. Note that the terminal node may be determined by other methods.

The first test execution unit 15 performs a ping test in which ping is executed between terminal nodes, and writes first test result information indicating the result into the storage unit 12 (step S103). Note that the ping test between a switch Ni and a switch Nj (i and j each are an integer greater than or equal to 1, i≠j) is a test to perform both or either one of processing of instructing the switch Ni to transmit an echo request message to the switch Nj and give notice of a result of whether an echo reply message is received and processing of instructing the switch Nj to transmit an echo request message to the switch Ni and give notice of a result of whether an echo reply message is received.

FIG. 5 is a diagram illustrating a failure location in the VLAN network illustrated in FIG. 2. In the present embodiment, an example is given of a case where a fault or failure (also collectively referred to as a failure) occurs in a connection port of connection ports included in the switch N5, the connection port being for connection to the switch N3. In step S102, the first test execution unit 15 extracts the switches N8, N10, N14, and N15 as terminal nodes of the VLAN network.

FIG. 6 is a diagram illustrating the first test result information. This first test result information indicates the result of ping executed between terminal nodes of the VLAN network illustrated in FIG. 5 by the first test execution unit 15 in step S103. Specifically, the first test execution unit 15 uses the switches N8, N10, N14, and N15 to generate all combinations of two terminal nodes. For each of the combinations, the first test execution unit 15 instructs a switch N of a terminal node to execute ping between terminal nodes, acquires the result thereof, and writes the first test result information indicating the obtained result into the storage unit 12. The starting point is a switch N that transmits an echo request, and the target is a switch N which is the destination of the echo request. "Good" indicates that connectivity has been verified, and "poor" indicates that connectivity has not been verified (has been NG). Note that another expression may be used, such as using 0 or 1 for a set value representing that connectivity has been verified or that connectivity has not been verified. As illustrated in FIG. 6, connectivity verification is NG between the switch N8 and the switch N15, between the switch N8 and the switch N10, between the switch N14 and the switch N15, and between the switch N14 and the switch N10.

In the flowchart of FIG. 4, the selection unit 16 selects a portion between terminal nodes having the smallest number of nodes present between the terminal nodes, of portions between terminal nodes in which the connectivity test has been NG, with reference to the network configuration information and the first test result information (step S104).

FIG. 7 is a diagram illustrating the number of nodes in a connection between terminal nodes in which connectivity has not been verified (has been NG), and the nodes. Between the switch N8 and the switch N15, there are 10 nodes, that is, the switches N8, N7, N6, N5, N3, N4, N12, N11, N16, and N15. Between the switch N8 and the switch N10, there are 9 nodes, that is, the switches N8, N7, N6, N5, N3, N4, N12, N11, and N10. Between the switch N14 and the switch N15, there are 9 nodes, that is, the switches N14, N6, N5, N3, N4, N12, N11, N16, and N15. Between the switch N14 and the switch N10, there are 8 nodes, that is, the switches N14, N6, N5, N3, N4, N12, N11, and N10. Thus, the selection unit 16 selects the portion between the switch N14 and the switch N10 as the minimum node connection, among the four connections between terminal nodes in which connectivity verification has been NG.

In the flowchart of FIG. 4, the second test execution unit 17 performs the ping test between all nodes related to the minimum node connection selected in step S104, and writes second test result information indicating the result into the storage unit 12 (step S105). The failure location estimation unit 18 refers to the second test result information to identify a temporary failure location (step S106). In a case where the first test result information and assumed test result information when a fault occurs in the node of the temporary failure location match, the failure location estimation unit 18 makes a final determination that a failure has occurred in the temporary failure location (step S107).

Figure 8:
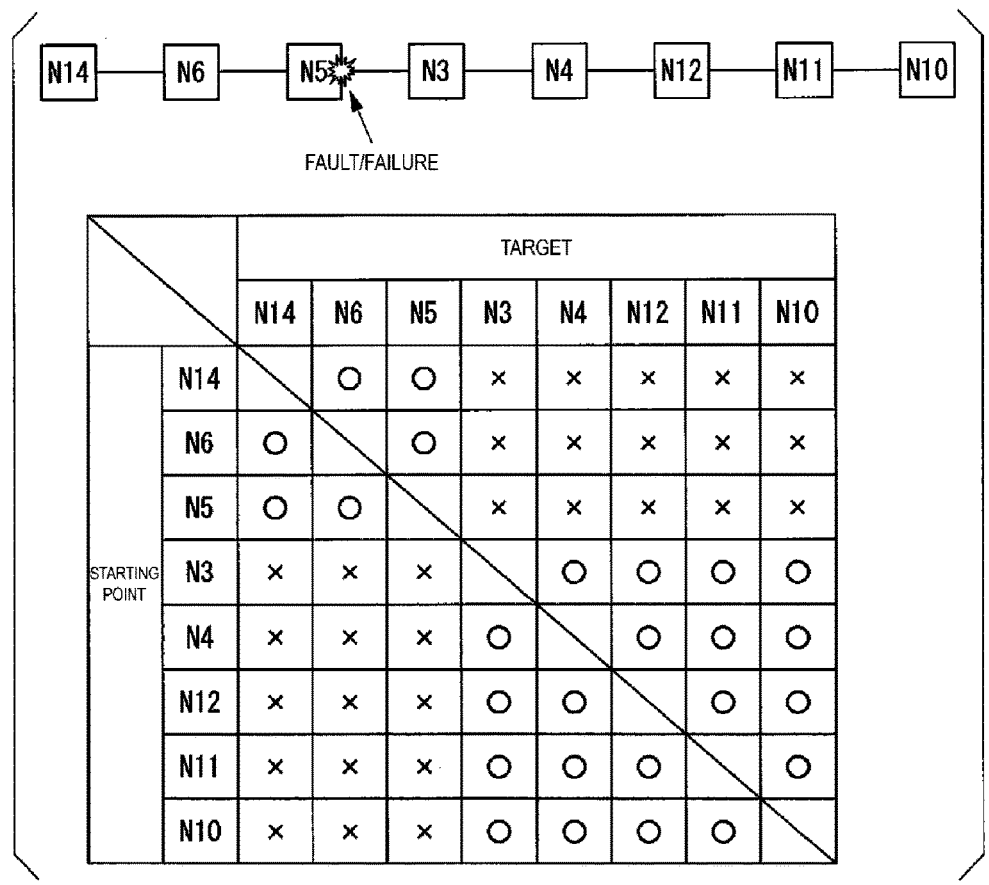
FIG. 8 is a diagram illustrating a connection configuration and second test result information of a minimum node connection according to the first embodiment.

FIG. 8 is a diagram illustrating a connection configuration and second test result information of a minimum node connection. The upper side of FIG. 8 illustrates the connection configuration between the switch N14 and the switch N10, which is the minimum node connection selected in step S104. The second test execution unit 17 uses the switches N14, N6, N5, N3, N4, N12, N11, and N10 constituting the portion between the switch N14 and the switch N10 to generate all combinations of two nodes. For each of the combinations, the second test execution unit 17 performs the ping test between nodes, and generates the second test result information illustrated on the lower side of FIG. 8.

Based on this second test result information, the failure location estimation unit 18 assumes that a failure has occurred in the connection between the switch N5 and the switch N3. That is, with regard to a switch group (switches N14, N6, N5) from the switch N14, which is a terminal node, to the switch N5, connectivity is verified within the switch group, but connectivity verification is NG with a switch group (switches N3, N4, N12, N11, N10) from the switch N3 to the switch N10, which is the other terminal node. Furthermore, with regard to the switch group from the switch N3 to the switch N10, connectivity is verified within the switch group, but connectivity verification is NG with the switch group from the switch N14 to the switch N5. Thus, it can be assumed that a failure has occurred in the connection between the switch N5 and the switch N3. The failure location estimation unit 18 determines that a temporary failure location is between the switch N5 and the switch N3.

Figure 9:
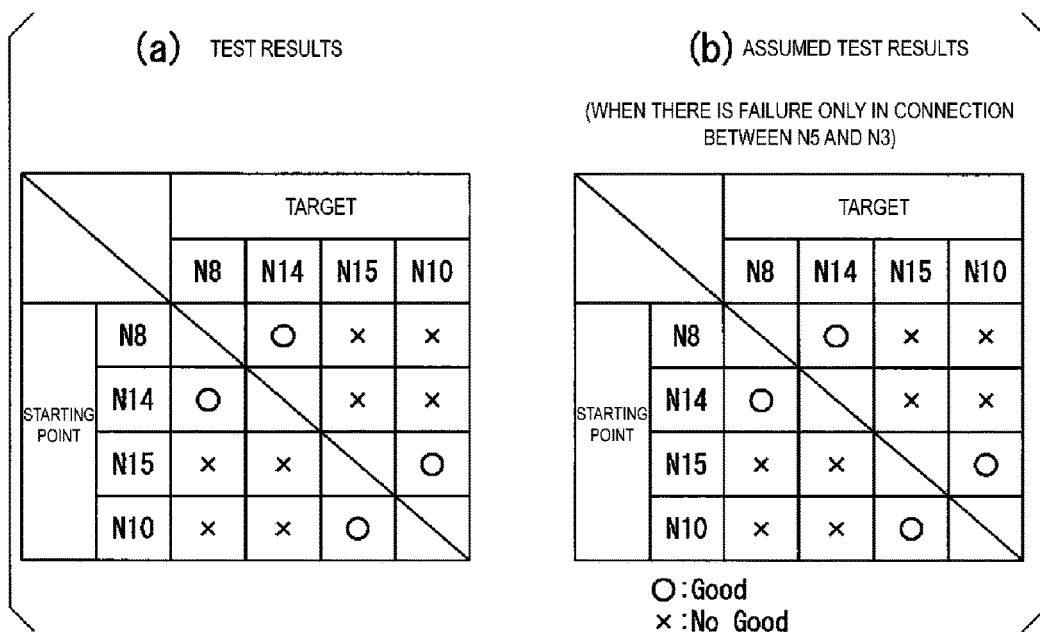
FIG. 9 is a diagram illustrating a comparison between the first test result information and assumed test result information according to the first embodiment.

FIG. 9 is a diagram illustrating a comparison between the first test result information and the assumed test result information. FIG. 9(*a*) is a result of ping executed between terminal nodes in step S103, and is the same diagram as the first test result information illustrated in FIG. 6. FIG. 9(*b*) is a diagram illustrating the assumed test result information assumed when a failure occurs in a connection between the switch N5 and the switch N3. In order to obtain the assumed test result information as illustrated in FIG. 9(*b*), a virtual test may be performed on a connection relationship model between terminal nodes after a failure occurs. Alternatively, a connection relationship between terminal nodes may be modeled in advance and assumed test result information corresponding to a failure pattern in the model may be created to select assumed test result information of the corresponding failure pattern in accordance with the temporary failure location. The first test result information illustrated in FIG. 9(*a*) and the assumed test result information illustrated in FIG. 9(*b*) match, and thus the failure location estimation unit 18 can infer that there is no other failure location. The failure location estimation unit 18 determines that a failure has occurred in the connection between the switch N5 and the switch N3, which has been the temporary failure location.

Second Embodiment

In the present embodiment, the VLAN network is divided into two partial networks (division number k=2), and a failure location is identified using the acknowledgement protocol. The present embodiment is a case where the number of failure locations is one.

Figure 10:
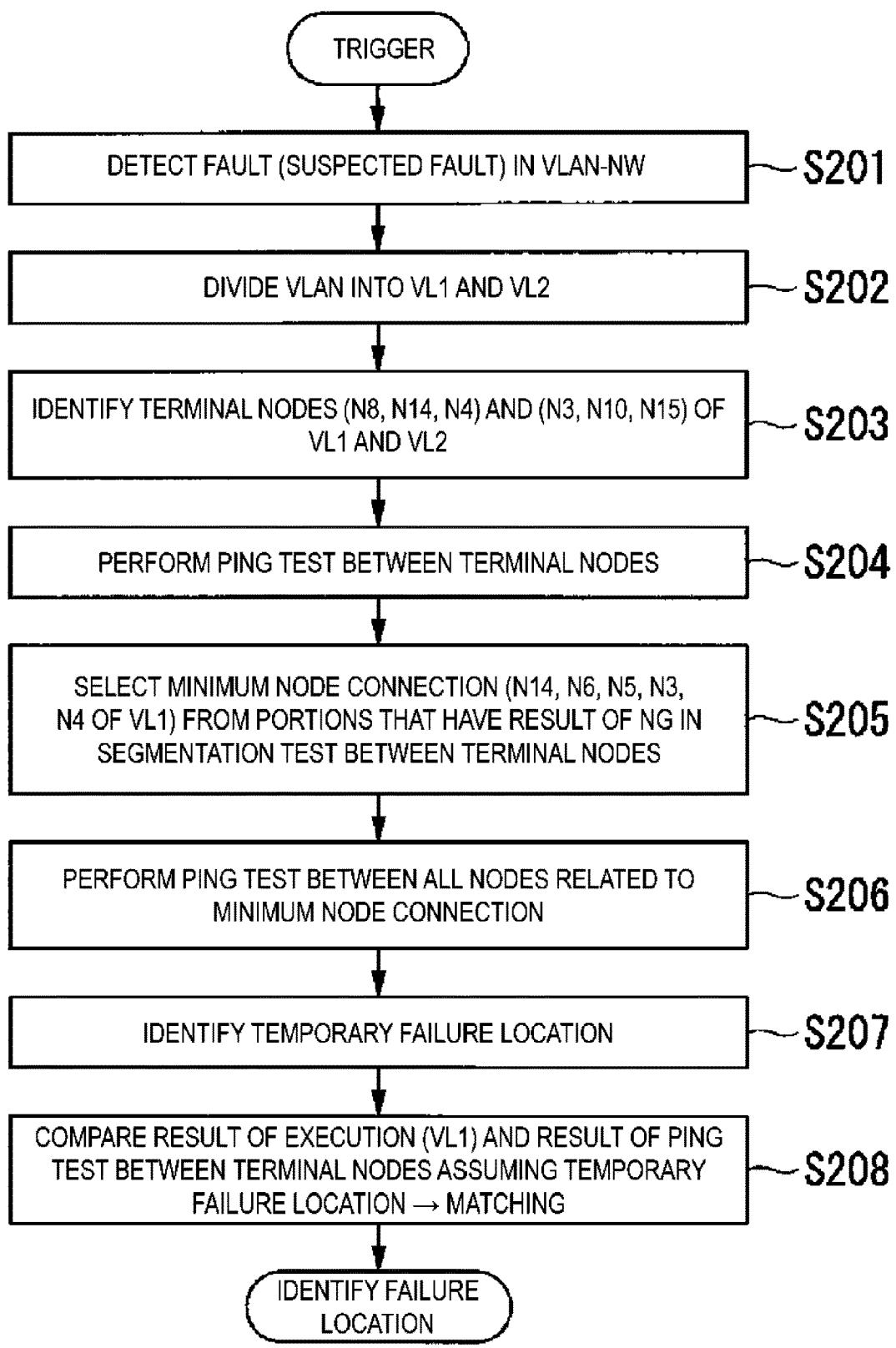
FIG. 10 is a flowchart illustrating processing of a failure location estimation apparatus according to a second embodiment.

FIG. 10 is a flowchart illustrating processing of the failure location estimation apparatus 1 according to the present embodiment. The processing illustrated in FIG. 10 will be described using FIGS. 11 to 15. The fault detection unit 13 of the failure location estimation apparatus 1 detects a fault or suspected fault in the VLAN network (VLAN-NW) (step S201). The division unit 14 divides the VLAN network indicated by the network configuration information into k partial networks (step S202). The first test execution unit 15 refers to the network configuration information to identify a terminal node of each of the partial networks (step S203). The first test execution unit 15 performs a ping test in which ping is executed between terminal nodes for each partial network, and writes first test result information indicating the result into the storage unit 12 (step S204).

FIG. 11 is a diagram illustrating a division of the VLAN network. In the present embodiment, as illustrated in FIG. 11, an example is given of a case where a failure occurs in a connection port of connection ports included in the switch N5, the connection port being for connection to the switch N3. In step S202, the division unit 14 divides the VLAN network into two partial networks VL1 and VL2 such that the switch N3 and the switch N4 are shared.

The terminal nodes of the partial network VL1 are switches N8, N14, and N4, and the terminal nodes of the partial network VL2 are switches N3, N15, and N10. The first test execution unit 15 executes ping between the switch N8 and the switch N14, between the switch N8 and the switch N4, and between the switch N8 and the switch N14 in the partial network VL1. Furthermore, the first test execution unit 15 executes ping between the switch N3 and the switch N15, between the switch N3 and the switch N10, and between the switch N15 and the switch N10 in the partial network VL2.

FIG. 12 is a diagram illustrating first test result information. FIG. 12(a) is the first test result information of the partial network VL1, and FIG. 12(b) is the first test result information of the partial network VL2. In the partial network VL2, connectivity is verified between terminal nodes of all combinations. On the other hand, in the partial network VL1, connectivity verification is NG between the switch N8 and the switch N4 and between the switch N14 and the switch N4.

In the flowchart of FIG. 10, the selection unit 16 refers to the network configuration information and the first test result information, and selects a portion between terminal nodes having the smallest number of nodes present between terminal nodes, of portions between terminal nodes in which the result of the connectivity test has been NG (step S205).

FIG. 13 is a diagram illustrating the number of nodes in a connection between terminal nodes in which connectivity has not been verified, and the nodes. The number of connections between terminal nodes in which the connectivity verification has been NG is two in the partial network VL1 and zero in the partial network VL2, and thus a segmentation process for the partial network VL2 is not required thereafter. Furthermore, as described above, the two portions between terminal nodes, in which the connectivity verification has been NG, in the partial network VL1, are the portion between the switch N8 and the switch N4 and the portion between the switch N14 and the switch N4. There are six nodes in the connection between the switch N8 and the switch N4, that is, switches N8, N7, N6, N5, N3, and N4, and there are five nodes between the switch N14 and the switch N4, that is, switches N14, N6, N5, N3, and N4. Thus, the selection unit 16 selects the portion between the switch N14 and the switch N4 as the minimum node connection, of the two connections between terminal nodes in which connectivity verification has been NG.

In the flowchart of FIG. 10, the second test execution unit 17 performs the ping test between all nodes related to the minimum node connection selected in step S205, and writes second test result information indicating the result into the storage unit 12 (step S206). The failure location estimation unit 18 refers to the second test result information to identify a temporary failure location (step S207). In a case where the first test result information and assumed test result information when a fault occurs in the temporary failure location match, the failure location estimation unit 18 determines that a failure has occurred in the temporary failure location (step S208).

Figure 14:
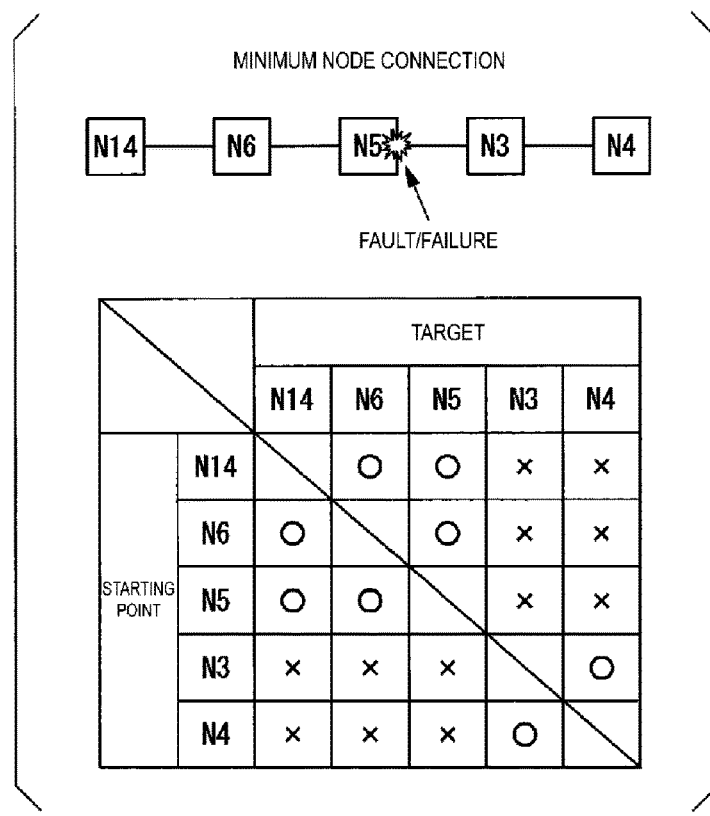
FIG. 14 is a diagram illustrating a connection configuration and second test result information of a minimum node connection according to the second embodiment.

FIG. 14 is a diagram illustrating a connection configuration and second test result information of a minimum node connection. The upper side of FIG. 14 illustrates the connection configuration between the switch N14 and the switch N4, which is the minimum node connection selected in step S205. The second test execution unit 17 uses the switches N14, N6, N5, N3, and N4 constituting the portion between the switch N14 and the switch N4 to generate all combinations of two nodes. For each of the combinations, the second test execution unit 17 performs the ping test between nodes, and generates the second test result information illustrated on the lower side of FIG. 14. Based on this second test result information, the failure location estimation unit 18 assumes that a failure has occurred in the connection between the switch N5 and the switch N3, and sets the connection as a temporary failure location.

Figure 15:
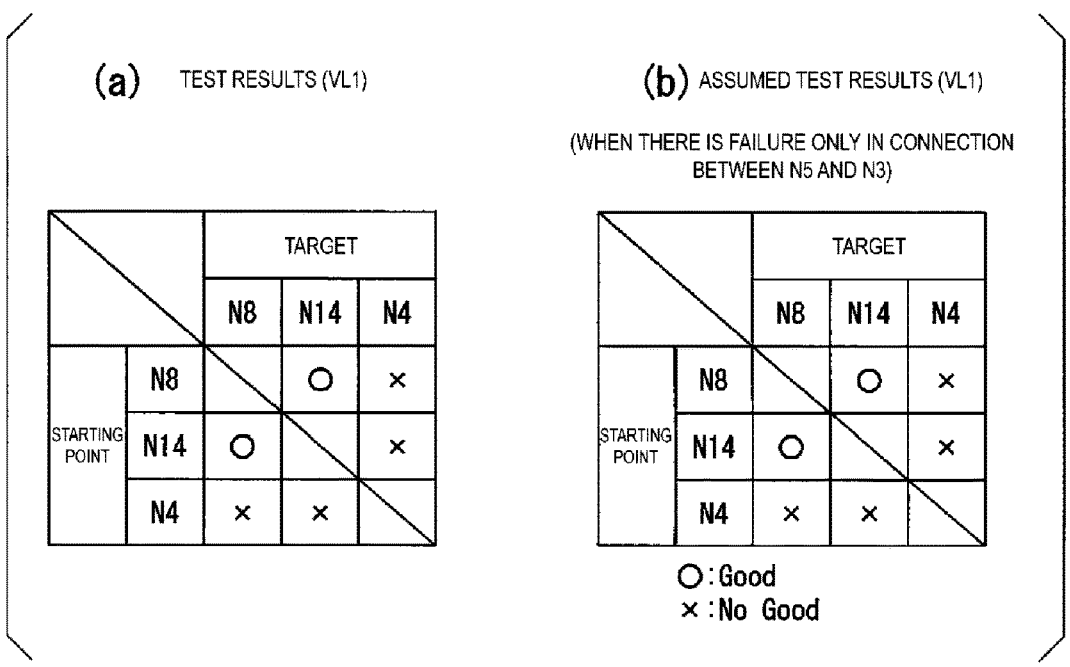
FIG. 15 is a diagram illustrating a comparison between the first test result information and assumed test result information of a partial network according to the second embodiment.

FIG. 15 is a diagram illustrating a comparison between the first test result information and the assumed test result information of the partial network VL1. FIG. 15(a) illustrates a result of ping executed between terminal nodes of the partial network VL1 in step S204, and is the same diagram as the first test result information illustrated in FIG. 12(a). FIG. 15(b) is a diagram illustrating the assumed test result information of the partial network VL1 assumed when a failure occurs only in the connection between the switch N5 and the switch N3. The first test result information of the partial network VL1 illustrated in FIG. 15(a) and the assumed test result information of the partial network VL1 illustrated in FIG. 15(b) match, and thus the failure location estimation unit 18 can infer that there is no other failure location. The failure location estimation unit 18 determines that a failure has occurred in the connection between the switch N5 and the switch N3, which has been the temporary failure location.

Note that examples of a method for determining a division position when the division unit 14 divides the network to be validated into partial networks include: (1) setting an upper limit on the number of nodes belonging to one partial network and performing division within that number; (2) dividing the network to be validated equally by the number of nodes; and (3) performing division in accordance with a preset dividing point by an operator.

Figures 16, 17:
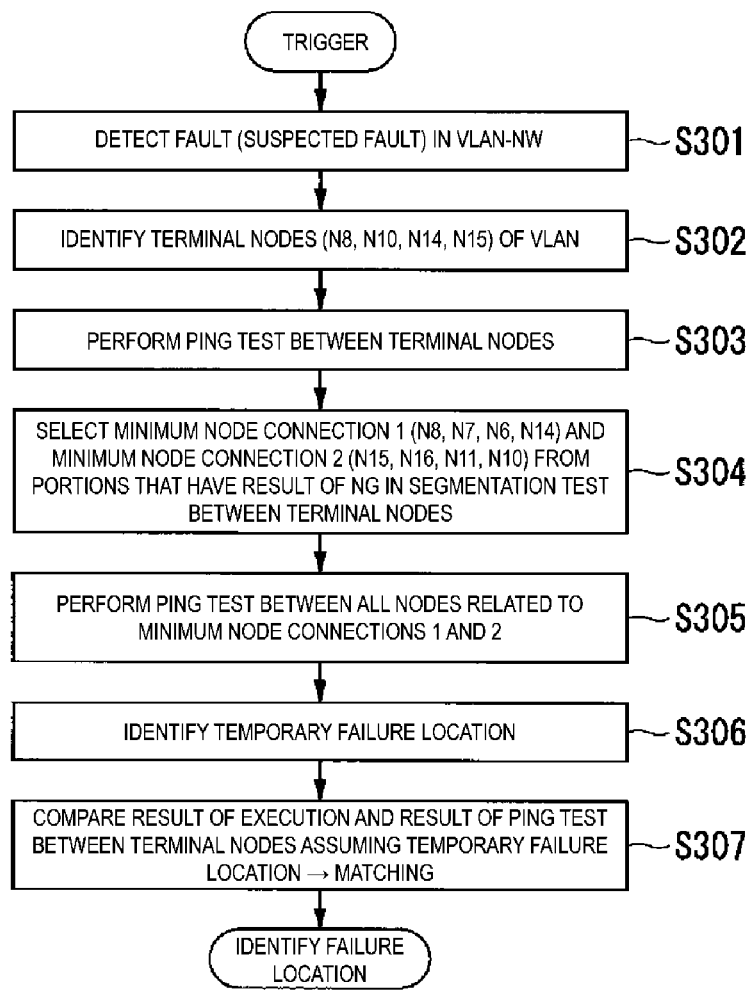
FIG. 16 is a diagram illustrating the number of times of execution of ping according to the first embodiment and the second embodiment.
FIG. 17 is a flowchart illustrating processing of a failure location estimation apparatus according to a third embodiment.

FIG. 16 is a diagram illustrating the number of times of execution of ping according to the first embodiment and the second embodiment.

In both the first and second embodiments, it can be seen that the number of times of execution of ping is significantly reduced, compared to a case where ping is executed on all nodes.

Third Embodiment

In the present embodiment, multiple (double) failure locations are identified using the acknowledgement protocol (ping) without dividing the VLAN network (division number k=1). In the present embodiment, there are multiple (two) minimum node connections.

FIG. 17 is a flowchart illustrating processing of the failure location estimation apparatus 1 according to the present embodiment. The processing illustrated in FIG. 17 will be described using FIGS. 18 to 22. The fault detection unit 13 of the failure location estimation apparatus 1 detects a fault or suspected fault in the VLAN network (VLAN-NW) (step S301). Because k=1, the division unit 14 sets the entire VLAN network as a diagnostic unit network. The first test execution unit 15 refers to the network configuration information to identify a terminal node of the VLAN network (step S302). The first test execution unit 15 performs the ping test in which ping is executed between terminal nodes, and writes first test result information indicating the result into the storage unit 12 (step S303).

FIG. 18 is a diagram illustrating failure locations in the VLAN network illustrated in FIG. 2. In the present embodiment, an example is given of a case where a fault or failure occurs in a connection port of connection ports included in the switch N7, the connection port being for connection to the switch N6 (described as fault/failure A), and a fault or failure occurs in a connection port of connection ports included in the switch N16, the connection port being for connection to the switch N15 (described as fault/failure B). In step S302, the first test execution unit 15 extracts the switches N8, N10, N14, and N15 as terminal nodes of the VLAN network.

FIG. 19 is a diagram illustrating the first test result information. This first test result information shows the result of ping executed between the extracted terminal nodes by the first test execution unit 15 in step S303. As shown in FIG. 19, connectivity verification is NG in 5 portions between terminal nodes, that is, between the switch N8 and the switch N14, between the switch N8 and the switch N15, between the switch N8 and the switch N10, between the switch N14 and the switch N15, and between the switch N15 and the switch N10.

In the flowchart of FIG. 17, the selection unit 16 refers to the network configuration information and the first test result information, and selects a portion between terminal nodes having the smallest number of nodes present between terminal nodes, of portions between terminal nodes in which the connectivity test has been NG (step S304).

FIG. 20 is a diagram illustrating the number of nodes in a connection between terminal nodes in which connectivity has not been verified (has been NG), and the nodes. Of the five connections between terminal nodes in which connectivity has not been verified, as a connection between terminal nodes which may be a minimum node connection, there are two portions, that is, a portion between the switch N8 and the switch N14 and a portion between the switch N15 and the switch N10, and there is no common node (switch N) for the connections between terminal nodes that constitute the portions. That is, the connection between terminal nodes between the switch N8 and the switch N14 and the connection between terminal nodes between the switch N15 and the switch N10 are in a disjoint relationship (a relationship that has no common node). Thus, the first test execution unit 15 selects both of them as the minimum node connection. In the following, the portion between the switch N8 and the switch N14 is described as a minimum node connection 1, and the portion between the switch N15 and the switch N10 is described as a minimum node connection 2.

In the flowchart of FIG. 17, for each of the minimum node connection 1 and the minimum node connection 2 selected in step S304, the second test execution unit 17 performs the ping test between all nodes related to the minimum node connection, and writes second test result information indicating the result into the storage unit 12 (step S305). The failure location estimation unit 18 refers to the second test result information to identify a temporary failure location (step S306). In a case where the first test result information and assumed test result information when a fault occurs in the node of the temporary failure location match, the failure location estimation unit 18 makes a final determination that a failure has occurred in the temporary failure location (step S307).

Figure 21:
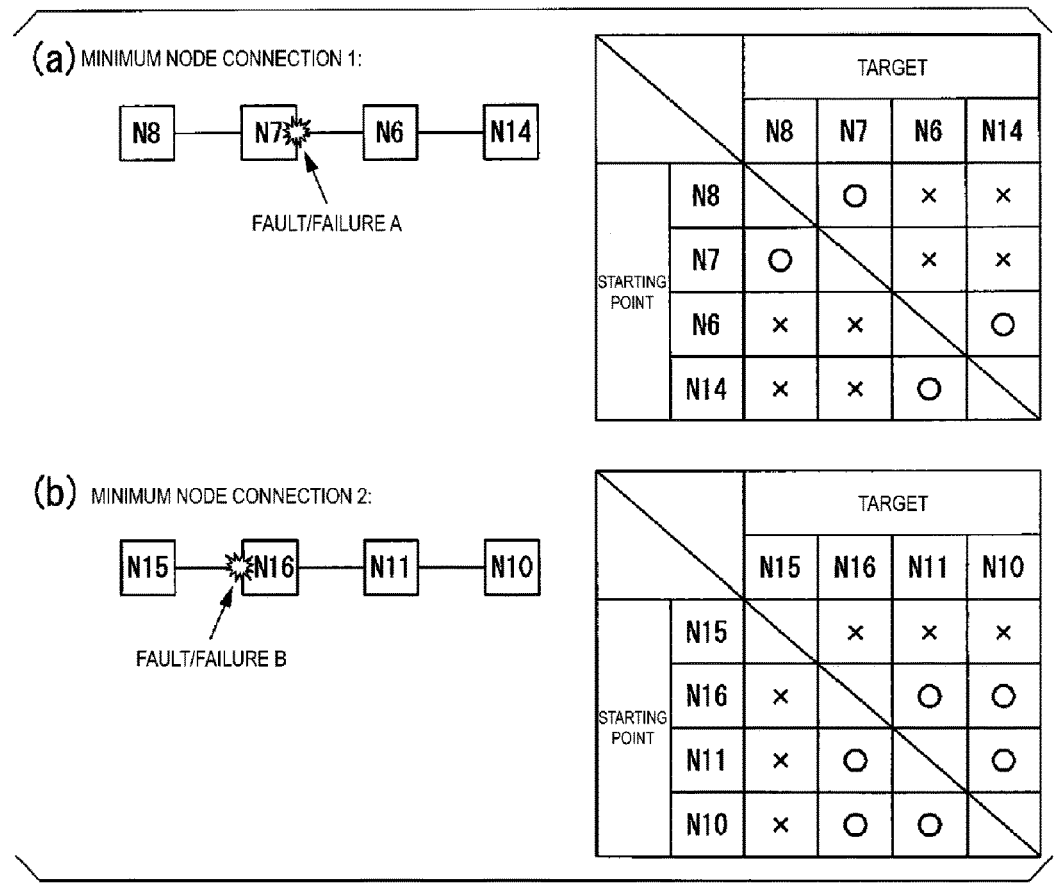
FIG. 21 is a diagram illustrating a connection configuration and second test result information of each of minimum node connections according to the third embodiment.

FIG. 21 is a diagram illustrating a connection configuration and second test result information of a minimum node connection for each of the minimum node connections 1 and 2. The left side of FIG. 21(a) illustrates the connection configuration between terminal nodes of the minimum node connection 1, and the right side of FIG. 21(a) illustrates the second test result information of the minimum node connection 1. The left side of FIG. 21(b) illustrates the connection configuration between terminal nodes of the minimum node connection 2, and the right side of FIG. 21(b) illustrates the second test result information of the minimum node connection 2.

Based on the second test result information illustrated in FIG. 21(a), the failure location estimation unit 18 assumes that a failure has occurred in the connection between the switch N7 and the switch N6. Furthermore, based on the second test result information illustrated in FIG. 21(b), the failure location estimation unit 18 assumes that a failure has occurred in the connection between the switch N15 and the switch N16. The failure location estimation unit 18 determines that a portion between the switch N15 and the switch N16 and a portion between the switch N7 and the switch N6 are temporary failure locations.

Figure 22:
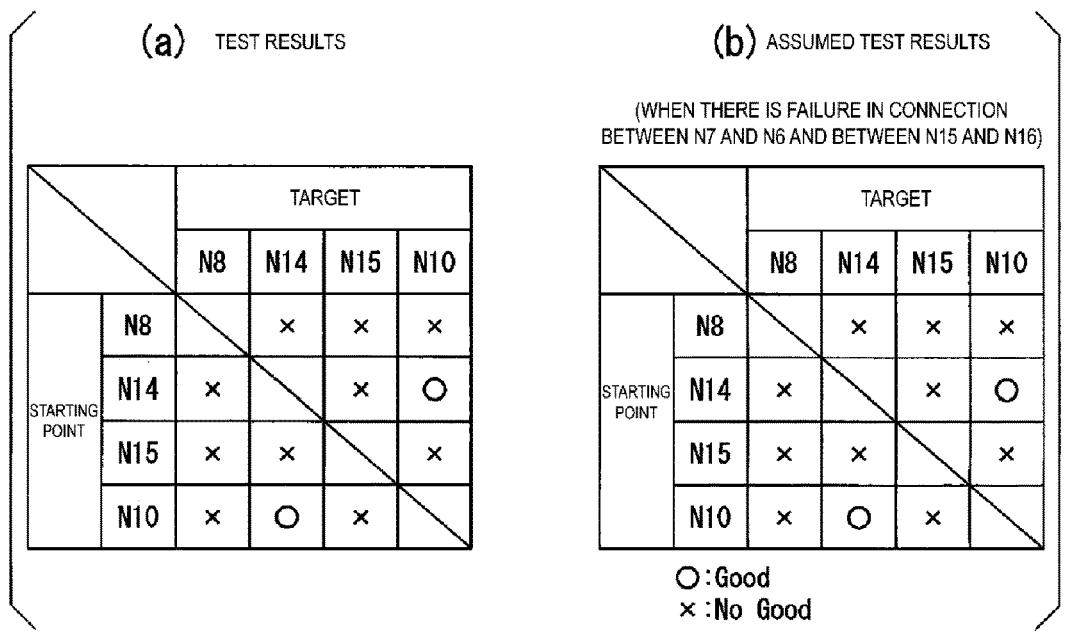
FIG. 22 is a diagram illustrating a comparison between the first test result information and assumed test result information according to the third embodiment.

FIG. 22 is a diagram illustrating a comparison between the first test result information and the assumed test result information. FIG. 22(a) illustrates a result of ping executed between terminal nodes in step S303, and is the same diagram as the first test result information illustrated in FIG. 19. FIG. 22(b) is a diagram illustrating the assumed test result information assumed when a failure occurs in the connection between the switch N7 and the switch N6 and in the connection between switch N15 and switch N16. The first test result information illustrated in FIG. 22(a) and the assumed test result information illustrated in FIG. 22(b) match, and thus the failure location estimation unit 18 can infer that there is no other failure location. The failure location estimation unit 18 determines that a failure has occurred in the connection between the switch N7 and the switch N6, and the connection between the switch N15 and the switch N16, which have been the temporary failure locations.

Fourth Embodiment

In the present embodiment, the VLAN network is divided into two partial networks (division number k=2), and multiple (double) failure locations are identified using the acknowledgement protocol (ping). The present embodiment is a case where two failures occur in one partial network.

Figure 23:
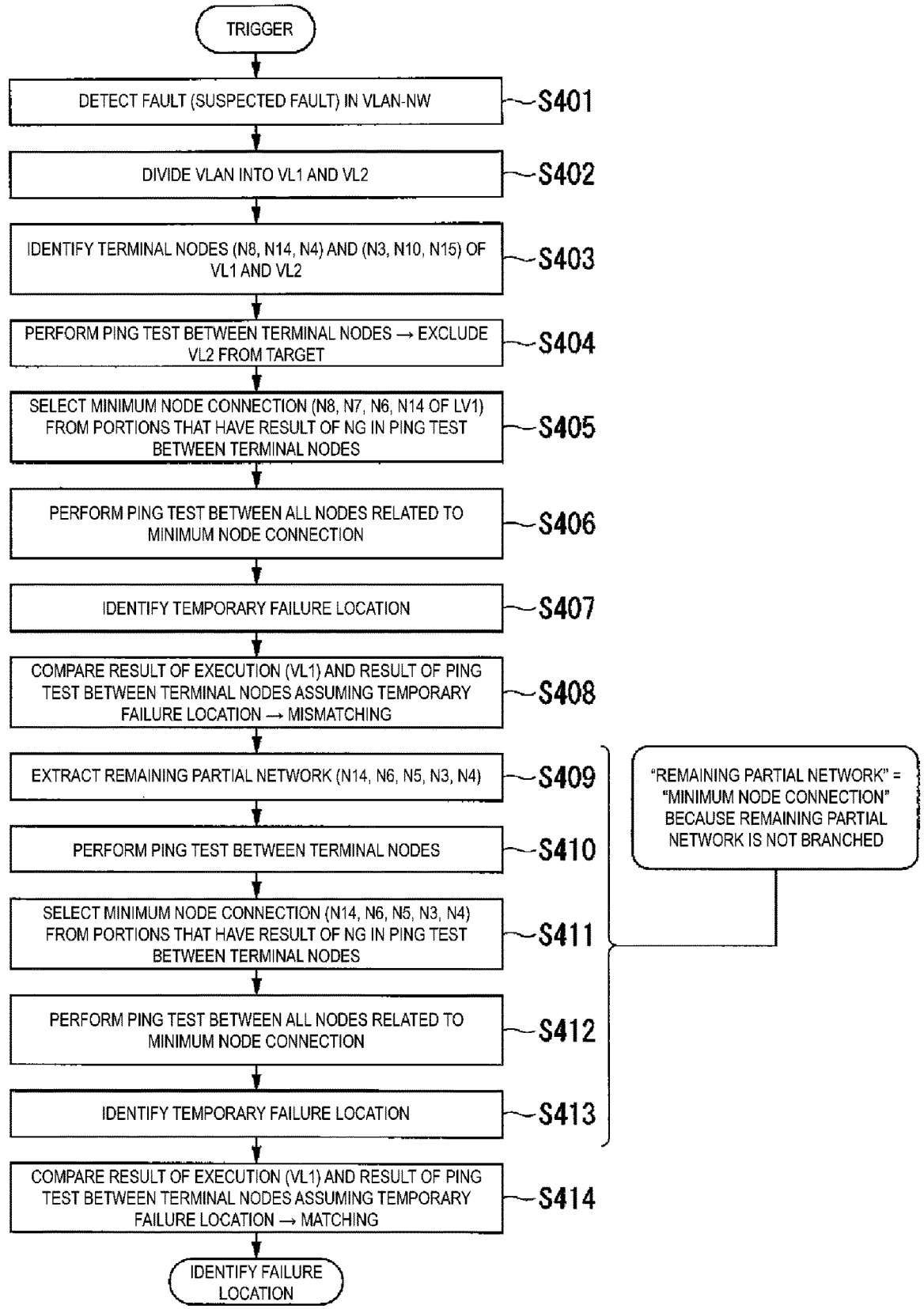
FIG. 23 is a flowchart illustrating processing of a failure location estimation apparatus according to a fourth embodiment.

FIG. 23 is a flowchart illustrating processing of the failure location estimation apparatus 1 according to the present embodiment. The processing illustrated in FIG. 23 will be described using FIGS. 22 to 31. The fault detection unit 13 of the failure location estimation apparatus 1 detects a fault or suspected fault in the VLAN network (VLAN-NW) (step S401). The division unit 14 divides the VLAN network indicated by the network configuration information into k partial networks to form diagnostic unit networks (step S402). The first test execution unit 15 refers to the network configuration information to identify terminal nodes of each of the partial networks (step S403). The first test execution unit 15 performs the ping test in which ping is executed between terminal nodes for each partial network, and writes first test result information indicating the result into the storage unit 12 (step S404).

FIG. 24 is a diagram illustrating a division of the VLAN network. In the present embodiment, an example is given of a case where a fault or failure occurs in a connection port of connection ports included in the switch N7, the connection port being for connection to the switch N6 (described as fault/failure A), and a fault or failure occurs in a connection port of connection ports included in the switch N16, the connection port being for connection to the switch N15 (described as fault/failure B). In step S402, the division unit 14 divides the VLAN network into two partial networks VL1 and VL2 such that the switch N3 and the switch N4 are shared.

The terminal nodes of the partial network VL1 are switches N8, N14, and N4, and the terminal nodes of the partial network VL2 are switches N3, N15, and N10. The first test execution unit 15 executes ping between the switch N8 and the switch N14, between the switch N8 and the switch N4, and between the switch N8 and the switch N14 in the partial network VL1, and executes ping between the switch N3 and the switch N15, between the switch N3 and the switch N10, and between the switch N15 and the switch N10 in the partial network VL2.

FIG. 25 is a diagram illustrating the first test result information. FIG. 25(a) illustrates the first test result information of the partial network VL1, and FIG. 25(b) illustrates the first test result information of the partial network VL2. In the partial network VL2, connectivity is verified between terminal nodes of all combinations. On the other hand, in the partial network VL1, connectivity verification is NG between the switch N8 and the switch N14, between the switch N8 and the switch N4, and between the switch N14 and the switch N4.

In the flowchart of FIG. 23, the selection unit 16 refers to the network configuration information and the first test result information, and selects a portion between terminal nodes having the smallest number of nodes present between the terminal nodes, of portions between terminal nodes in which the connectivity test has been NG (step S405).

FIG. 26 is a diagram illustrating the number of nodes in a connection between terminal nodes in which connectivity has not been verified, and the nodes. There is no connection between terminal nodes in which the connectivity verification has been NG in the partial network VL2, and thus a segmentation process for the partial network VL2 is not required thereafter. The numbers of nodes in the three connections between terminal nodes, that is, between the switch N8 and the switch N4, between the switch N8 and the switch N14, and between the switch N14 and the switch N4, in which connectivity has not been verified in the partial network VL1, are 6, 4, and 5, respectively. Thus, the selection unit 16 selects the connection between terminal nodes between the switch N8 and the switch N14 as a minimum node connection.

In the flowchart of FIG. 23, the second test execution unit 17 performs the ping test between all nodes related to the minimum node connection selected in step S405, and writes second test result information indicating the result into the storage unit 12 (step S406). The failure location estimation unit 18 refers to the second test result information to identify a temporary failure location (step S407). The failure location estimation unit 18 compares the first test result information and assumed test result information when a fault occurs in the temporary failure location (step S408).

Figure 27:
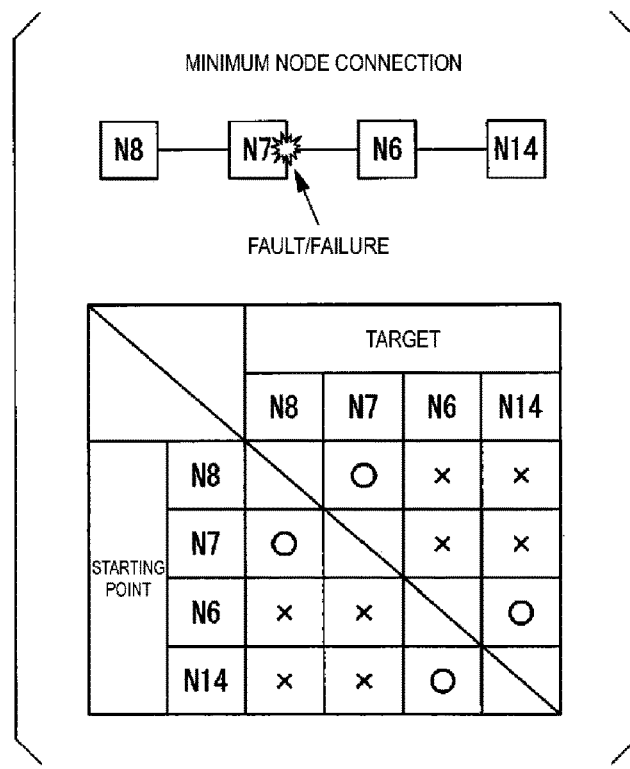
FIG. 27 is a diagram illustrating a connection configuration and second test result information of a minimum node connection according to the fourth embodiment.

FIG. 27 is a diagram illustrating a connection configuration and second test result information of a minimum node connection. The upper side of FIG. 27 illustrates the connection configuration between the switch N8 and the switch N14, which is the minimum node connection selected in step S405, and the lower side of FIG. 27 diagram illustrates the second test result information of the minimum node connection. Based on the second test result information illustrated on the lower side of FIG. 27, the failure location estimation unit 18 assumes that a failure has occurred in the connection between the switch N7 and the switch N6, and estimates that the connection is a temporary failure location.

Figure 28:
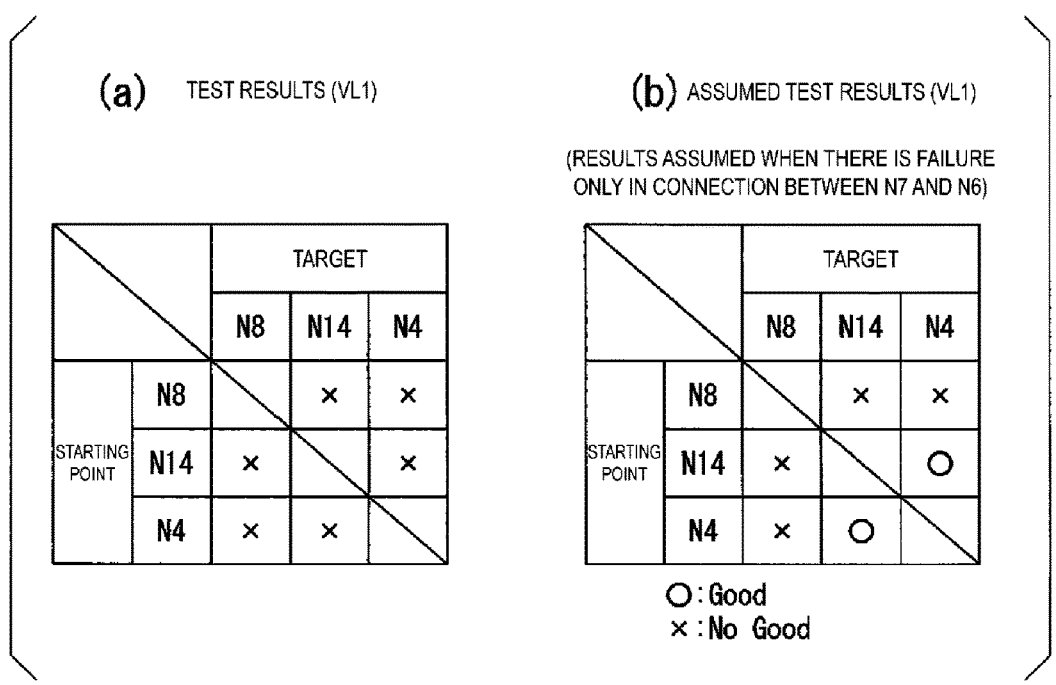
FIG. 28 is a diagram illustrating a comparison between the first test result information and assumed test result information according to the fourth embodiment.

FIG. 28 is a diagram illustrating a comparison between the first test result information of the partial network VL1 and the assumed test result information. FIG. 28(a) illustrates a result of ping executed between terminal nodes of the partial network VL1 in step S404, and is the same diagram as the first test result information illustrated in FIG. 25(a). FIG. 28(b) is a diagram illustrating the assumed test result information of the partial network VL1 assumed when a failure has occurred only in the connection between the switch N7 and the switch N6. The failure location estimation unit 18 compares these, and infers that there is another failure location due to inconsistency between them.

In the flowchart of FIG. 23, the division unit 14 extracts a remaining partial network including portions excluding the previously selected minimum node connection, of the partial network VL1 (step S409). The failure location estimation apparatus 1 performs the same processing as in steps S403 to S408, with the remaining partial network serving as a diagnostic unit network. Here, the first test execution unit 15 performs the ping test in which ping is executed between terminal nodes of the remaining partial network, and writes first test result information indicating the result into the storage unit 12 (step S410). The selection unit 16 refers to the network configuration information and the first test result information, and selects a portion between terminal nodes having the smallest number of nodes present between the terminal nodes as a minimum node connection, of portions between terminal nodes of the remaining partial network, in which the connectivity test has been NG (step S411).

Figure 29:
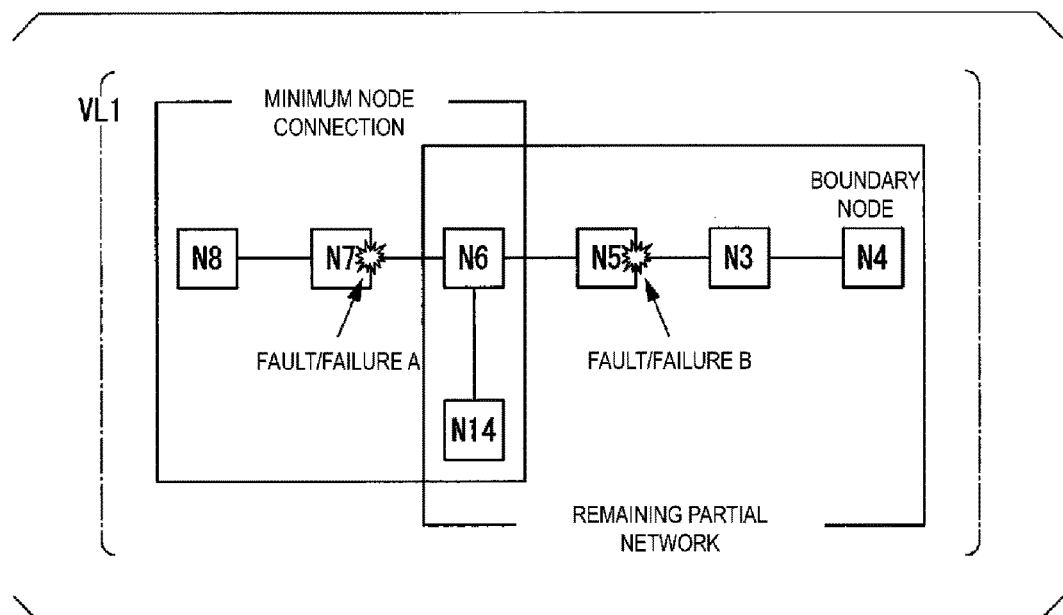
FIG. 29 is a diagram illustrating a minimum node connection and a remaining partial network in a partial network according to the fourth embodiment.

FIG. 29 is a diagram illustrating a minimum node connection and remaining partial network in the partial network VL1. The connectivity between the switch N6 and the switch N14 has been verified by ping executed for the minimum node connection selected in step S405, and thus it is possible not to include the portion between the switch N6 and the switch N14 in the remaining partial network. However, here, the remaining partial network is made to share two switches with the minimum node connection. In addition, terminal nodes of the remaining partial network are the switch N14 and the switch N4, and connectivity verification between the switch N14 and the switch N4 is NG in the result obtained by ping. Thus, the selection unit 16 sets a portion between the switch N14 and the switch N4 as a minimum node connection. As described above, in the present embodiment, the remaining partial network and the minimum node connection are the same because the remaining partial network is not branched.

In the flowchart of FIG. 23, the second test execution unit 17 performs the ping test between all nodes related to the minimum node connection selected in step S411, and writes second test result information indicating the result into the storage unit 12 (step S412). The failure location estimation unit 18 refers to the second test result information written in step S412 to identify a temporary failure location (step S413). The failure location estimation unit 18 compares the first test result information and assumed test result information when a fault occurs in the node of the temporary failure location, and, when the first test result information and the assumed test result information match, the failure location estimation unit 18 sets the temporary failure location as a final determination result (step S414).

Figure 30:
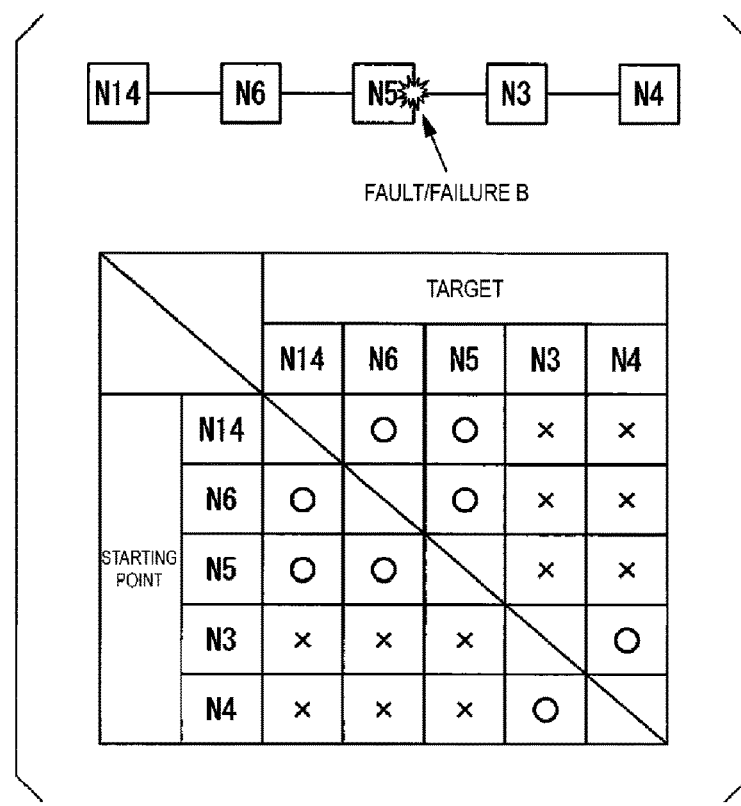
FIG. 30 is a diagram illustrating a connection configuration and second test result information of the minimum node connection in the remaining partial network according to the fourth embodiment.

FIG. 30 is a diagram illustrating a connection configuration and second test result information of the minimum node connection in the remaining partial network. The upper side of FIG. 30 illustrates a connection configuration between terminal nodes of the minimum node connection (between the switch N14 and the switch N4) in the remaining partial network. The lower side of FIG. 30 illustrates the second test result information indicating the result of ping executed on all combinations of the switches N14, N6, N5, N3, and N4 constituting the minimum node connection. Based on the second test result information shown on the lower side of FIG. 30, the failure location estimation unit 18 assumes that a failure has occurred in the connection between the switch N5 and the switch N3, and estimates that the connection is a temporary failure location.

Figures 31, 32:
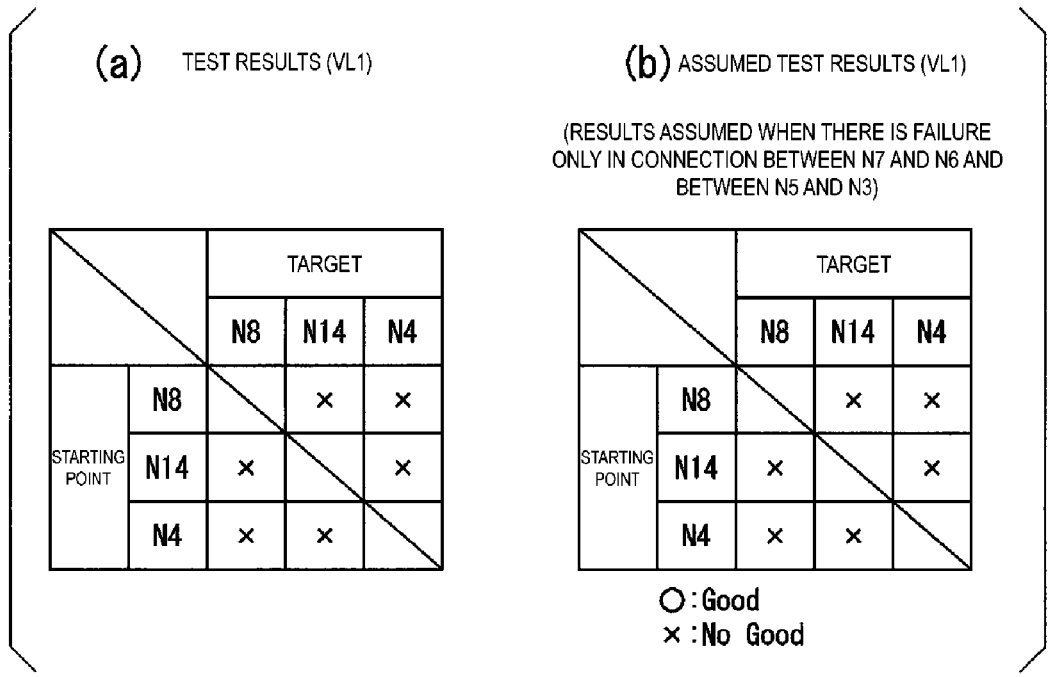
FIG. 31 is a diagram illustrating a comparison between the first test result information and assumed test result information according to the fourth embodiment.
FIG. 32 is a diagram illustrating the number of times of execution of ping according to the third embodiment and the fourth embodiment.

FIG. 31 is a diagram illustrating a comparison between the first test result information of the partial network VL1 and the assumed test result information. FIG. 31(a) illustrates a result of ping executed between terminal nodes of the partial network VL1 in step S404, and is the same diagram as the first test result information illustrated in FIG. 25(a). FIG. 31(b) is a diagram illustrating the assumed test result information of the partial network VL1 assumed when a failure occurs only in the connection between the switch N7 and the switch N6 and the connection between the switch N5 and the switch N3. The failure location estimation unit 18 compares these and infers that there is no other failure location because they match.

FIG. 32 is a diagram illustrating the number of times of execution of ping in the third embodiment and the fourth embodiment.

In both the third and fourth embodiments, it can be seen that the number of times of execution of ping is significantly reduced compared to a case where ping is executed on all nodes.

Note that in each of the embodiments described above, explanation has been given in the state where the network configuration information is acquired in advance in the normal time (prior to failure detection) and stored in the storage unit 12, but a form in which network configuration information related to the network is acquired after failure detection may be adopted. In that case, between steps S101 and S102, between steps S201 and S202, between steps S301 and S302, and between steps S401 and S402, network configuration information is obtained.

Note that while in the embodiments described above, an example has been given in which the system is divided into two to search for a failure location, a method of dividing a system into two to search may be repeated, or a system may be divided into three or more from the beginning, each of which is applied.

In the above-described embodiments, while an example has been given of a case where there is only one logical network and the number of targets which become networks to be validated is one, a plurality of networks may be the networks to be validated. In a case where there are a plurality of target networks to be validated, the failure location estimation apparatus 1 adapts the above-described embodiments one by one for networks to be validated. The order of adaption may use a method of performing adaption from a network to be validated having a small number of nodes constituting the network, a method of performing adaptation from a network to be validated having a large number of nodes constituting the network, or the like.

According to the present embodiments, compared to the related art, there is an advantageous effect such as reducing the number of times of executing the acknowledgement protocol for the network to be validated, and simplifying the procedure for verifying connectivity.

The failure location estimation apparatus 1 described above includes a central processing unit (CPU), a memory, an auxiliary storage device, or the like connected through a bus and functions as described above by executing a diagnosis program. Note that all or some functions of the failure location estimation apparatus 1 may be realized using hardware such as an application specific integrated circuit (ASIC), a programmable logic device (PLD), or a field programmable gate array (FPGA). The diagnosis program may be recorded in a computer-readable recording medium. The computer-readable recording medium is, for example, a portable medium such as a flexible disk, a magneto-optical disk, a ROM or a CD-ROM, or a storage device such as a hard disk drive built into a computer system. The diagnosis program may be transmitted over an electrical communication line.

According to the above-described embodiments, the failure location estimation apparatus includes a division unit, a first connectivity verification unit, a selection unit, a second connectivity verification unit, and a failure location estimation unit. The division unit sets partial networks obtained by dividing a network having a plurality of nodes by a division number k (k is an integer of 1 or greater). The network is a physical network or a logical network including a physical node, a logical node, or a combination of physical and logical nodes. For example, the division unit sets partial networks such that two or more nodes identical to each other in two adjacent partial networks are shared.

The first connectivity verification unit sets the partial networks as diagnostic unit networks and for each diagnostic unit network, verifies connectivity of a path for each of combinations of terminal nodes in the relevant diagnostic unit network. The selection unit selects, for each diagnostic unit network, some or all combinations from combinations of terminal nodes determined to have an abnormality in connectivity in accordance with a predetermined rule, and sets the selected combination as a selected node connection. The predetermined rule is a rule in which, of combinations of terminal nodes determined to have an abnormality in connectivity, a combination having the smallest number of nodes passing between terminal nodes or a combination having the largest number of nodes passing between terminal nodes is selected. Alternatively, the predetermined rule is a rule in which a plurality of combinations that are in a disjoint relationship are selected.

The second connectivity verification unit verifies, for each diagnostic unit network, the path connectivity for each of combinations of nodes included in the selected node connection. The failure location estimation unit estimates a failure location in the network on the basis of a result of verifying the connectivity for each of these combinations of nodes. When an estimated result does not match the result of the connectivity verification previously performed, the failure location estimation unit sets a remaining partial network as a new diagnostic unit network, the remaining partial network including at least a portion of the diagnostic unit network excluding the selected node connection having the estimated failure location. The first connectivity verification unit, the selection unit, the second connectivity verification unit, and the failure location estimation unit perform the above-described processing on the new diagnostic unit network.

Note that the failure location estimation apparatus may be implemented using a single information processing apparatus, or may be implemented using a plurality of information processing apparatuses communicatively connected via a network. When a plurality of information processing apparatuses are used, each of the functional units included in the failure location estimation apparatus may be distributed and implemented in a plurality of information processing apparatuses. Alternatively, the nodes may have some or all functions of the failure location estimation apparatus.

The embodiments of the present invention have been described above in detail with reference to the drawings. However, specific configurations are not limited to those embodiments, and include any design or the like within the scope not departing from the gist of the present invention.

INDUSTRIAL APPLICABILITY

The present invention can be applied to a communication network.

REFERENCE SIGNS LIST

1 Failure location estimation apparatus
11 Communication unit
12 Storage unit
13 Fault detection unit
14 Division unit
15 First test execution unit
16 Selection unit
17 Second test execution unit
18 Failure location estimation unit

The invention claimed is:

1. A failure location estimation method, comprising:
a division step of setting a partial network, the partial network being obtained by dividing a network having a plurality of nodes by a division number k (k is an integer of 1 or greater);
a first connectivity verification step of setting the partial network as a diagnostic unit network and verifying, on a per diagnostic unit network basis, connectivity of a path for combinations of terminal nodes in the diagnostic unit network;
a selection step of selecting, on a per diagnostic unit network basis, some or all combinations of the combinations determined to have an abnormality in connectivity in the first connectivity verification step;
a second connectivity verification step of verifying, on a per diagnostic unit network basis, connectivity of a path for each of combinations of nodes included in a selected node connection, the selected node connection being the combinations selected in the selection step; and
a failure location estimation step of estimating a failure location in the network based on a verification result of connectivity in the second connectivity verification step;
wherein a remaining partial network including at least a portion of the diagnostic unit network excluding the selected node connection having the failure location estimated in the failure location estimation step is set as a new diagnostic unit network.

2. The failure location estimation method according to claim 1, wherein in the division step, the partial network is set such that two or more of the nodes identical to each other in two adjacent partial networks are shared.

3. The failure location estimation method according to claim 1, wherein in the selection step, a combination having a smallest or largest number of the nodes included in a connection between the terminal nodes, of the combinations of terminal nodes determined to have an abnormality in connectivity, is selected on a per diagnostic unit network basis.

4. The failure location estimation method according to claim 1, wherein in the selection step, two or more combinations not sharing any of the nodes are selected from the combinations of terminal nodes determined to have an abnormality in connectivity in the first connectivity verification step, on a per diagnostic unit network basis.

5. The failure location estimation method according to claim 1, wherein the first connectivity verification step, the selection step, the second connectivity verification step, and the failure location estimation step are performed using the new diagnostic unit network.

6. The failure location estimation method according to claim 1, wherein ping or traceroute using an Internet Control Message Protocol (ICMP) is used for verifying connectivity.

7. The failure location estimation method according to claim 1, wherein the network comprises a physical node, a logical node, or a combination of a physical node and a logical node.

8. A failure location estimation apparatus, comprising:
a processor; and
a storage medium having computer program instructions stored thereon, when executed by the processor, perform to:
set a partial network, the partial network being obtained by dividing a network having a plurality of nodes by a division number k (k is an integer of 1 or greater);
set the partial network as a diagnostic unit network and verify, on a per diagnostic unit network basis, connectivity of a path for combinations of terminal nodes;
select, on a per diagnostic unit network basis, some or all combinations of the combinations determined to have an abnormality in connectivity;
verify, on a per diagnostic unit network basis, connectivity of a path for each of combinations of nodes included in a selected node connection, the selected node connection being the combinations selected; and
estimate a failure location in the network based on a verification result of connectivity;
wherein a remaining partial network including at least a portion of the diagnostic unit network excluding the selected node connection having the failure location estimated in the failure location estimation step is set as a new diagnostic unit network.

* * * * *